(12) United States Patent
Jeong et al.

(10) Patent No.: US 9,069,760 B2
(45) Date of Patent: Jun. 30, 2015

(54) MOBILE TERMINAL AND CONTROLLING METHOD THEREOF

(75) Inventors: Byoungzoo Jeong, Seoul (KR); Jiyeon Lee, Seoul (KR); Hyoungsoo Kim, Gyeonggi-do (KR); Hyunho Jee, Incheon (KR)

(73) Assignee: LG ELECTRONICS INC., Seoul (KR)

( * ) Notice: Subject to any disclaimer, the term of this patent is extended or adjusted under 35 U.S.C. 154(b) by 333 days.

(21) Appl. No.: 13/163,579

(22) Filed: Jun. 17, 2011

(65) Prior Publication Data

US 2012/0050324 A1 Mar. 1, 2012

(30) Foreign Application Priority Data

Aug. 24, 2010 (KR) .................. 10-2010-0082135
Sep. 7, 2010 (KR) .................. 10-2010-0087455

(51) Int. Cl.
*G06F 17/30* (2006.01)
*H04N 1/21* (2006.01)

(52) U.S. Cl.
CPC .................. *G06F 17/30* (2013.01); *H04N 1/21* (2013.01); *G09G 2340/145* (2013.01)

(58) Field of Classification Search
CPC ............. G06F 3/016; G06F 2203/013; G06F 2203/014; G06F 3/011; G06F 3/03547; G06F 3/0416; G06F 3/0481; G06F 17/30241; G06F 3/04842; A61B 2019/2292; A61B 2019/5291; G06T 2210/28; G06T 2200/24
See application file for complete search history.

(56) References Cited

U.S. PATENT DOCUMENTS

| | | | | |
|---|---|---|---|---|
| 6,920,619 | B1 * | 7/2005 | Milekic ........................ | 715/859 |
| 8,098,894 | B2 * | 1/2012 | Soderstrom ................... | 382/104 |
| 2006/0284839 | A1 * | 12/2006 | Breed et al. .................. | 345/156 |
| 2007/0110338 | A1 * | 5/2007 | Snavely et al. ............... | 382/305 |
| 2008/0064499 | A1 * | 3/2008 | Grant et al. ..................... | 463/36 |
| 2008/0252595 | A1 * | 10/2008 | Boillot .......................... | 345/156 |
| 2008/0312824 | A1 * | 12/2008 | Jung ............................. | 701/208 |
| 2009/0076723 | A1 * | 3/2009 | Moloney ....................... | 701/209 |
| 2009/0082139 | A1 * | 3/2009 | Hart .............................. | 473/407 |
| 2009/0102859 | A1 | 4/2009 | Athsani et al. | |
| 2009/0116691 | A1 * | 5/2009 | Scholl .......................... | 382/103 |
| 2009/0313138 | A1 * | 12/2009 | Ratnakar ........................ | 705/27 |
| 2009/0325647 | A1 * | 12/2009 | Cho et al. ...................... | 455/567 |
| 2010/0004033 | A1 * | 1/2010 | Choe et al. .................... | 455/567 |
| 2010/0007475 | A1 * | 1/2010 | Lee et al. .................... | 340/407.1 |
| 2010/0115455 | A1 * | 5/2010 | Kim .............................. | 715/781 |
| 2010/0125405 | A1 * | 5/2010 | Chae et al. .................... | 701/200 |

(Continued)

FOREIGN PATENT DOCUMENTS

WO 2010032079 3/2010

OTHER PUBLICATIONS

Ahmaniemi, Teemu; Lantz, Vuokko; "Augmented Reality Target Finding Based on Tactile Cues," Nov. 2-4, 2009, ICMI-MLMI '09, 335-342.*

(Continued)

*Primary Examiner* — Kee M Tung
*Assistant Examiner* — Haixia Du
(74) *Attorney, Agent, or Firm* — Lee, Hong, Degerman, Kang & Waimey

(57) ABSTRACT

A mobile terminal and controlling method thereof are disclosed by which a user can be informed of an event associated with augmented reality based on an occurrence of the event using various haptic effects that differ from each other.

32 Claims, 37 Drawing Sheets

(56) References Cited

U.S. PATENT DOCUMENTS

| | | | |
|---|---|---|---|
| 2010/0257252 A1* | 10/2010 | Dougherty et al. | 709/217 |
| 2011/0025480 A1* | 2/2011 | Hwang et al. | 340/407.1 |
| 2011/0053642 A1* | 3/2011 | Lee | 455/556.1 |
| 2011/0061100 A1* | 3/2011 | Mattila et al. | 726/17 |
| 2012/0001939 A1* | 1/2012 | Sandberg | 345/633 |

OTHER PUBLICATIONS

Gerhard Reitmayr, Dieter Schmalstieg; "Location based applications for mobile augmented reality;" Feb. 2003; Australian Computer Society, Inc.; AUIC '03 Proceedings of the Fourth Australasian user interface conference on User interfaces 2003; vol. 18; 65-73.*

Hauser, "New Wikitude Version", XP002670142, Jun. 2009.

* cited by examiner

MOBILE TERMINAL AND CONTROLLING METHOD THEREOF

CROSS-REFERENCE TO RELATED APPLICATIONS

Pursuant to 35 U.S.C. §119(a), this application claims the benefit of earlier filing date and right of priority to Korean Patent Application Nos. 10-2010-0082135, filed on Aug. 24, 2010, and 10-2010-0087455 filed on Sep. 7, 2010, the contents of which are hereby incorporated by reference herein in their entirety.

FIELD OF THE INVENTION

The present invention relates to a mobile terminal, and more particularly, to a mobile terminal and controlling method thereof. Although the present invention is suitable for a wide scope of applications, it is particularly suitable for enhancing convenience in using the mobile terminal.

DISCUSSION OF THE RELATED ART

Mobile terminals are presently configured to perform various functions. Such functions include data and voice communications, capturing still images and video via a camera, recording audio, playing music files and outputting music via a speaker system, and displaying images and video on a display. Some mobile terminals include additional functionality that supports game playing, while other mobile terminals are also configured as multimedia players. More recently, mobile terminals have been configured to receive broadcast and multicast signals that permit viewing of content, such as videos and television programs.

Generally, terminals can be classified into mobile terminals and stationary terminals according to a presence or non-presence of mobility. Mobile terminals can also be classified into handheld terminals and vehicle mount terminals according to whether they are configured to be carried by hand.

There are ongoing efforts to support and increase the functionality of mobile terminals. Such efforts include software and hardware improvements, as well as changes and improvements in the structural components that form the mobile terminal.

Recent developments in mobile terminal technology include the use of augmented reality (hereinafter, "AR") technology for various purposes. AR is included in the field of virtual reality. AR is a computer graphic scheme that enables a virtual object or information to appear as if it includes a real object existing in an original environment by synthesizing a real environment with the virtual object or information.

For example, AR allows a camera of a mobile terminal that is focused on an object, such as a building, to have an object information item, such as a phone number or a homepage, appear above or on top of the object. A user is able to use the object information item either directly or indirectly.

SUMMARY OF THE INVENTION

Accordingly, the present invention is directed to a mobile terminal and controlling method thereof that substantially obviate one or more problems due to limitations and disadvantages of the related art. An object of the present invention is to provide a mobile terminal and a controlling method thereof by which a user can be informed of an occurrence of an event associated with augmented reality by using various haptic effects.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims thereof as well as the appended drawings.

To achieve these objects and other advantages and in accordance with the purpose of the invention, as embodied and broadly described herein, a mobile terminal according to the present invention includes a mobile terminal including a camera configured for capturing an image for an augmented reality (AR) function of the mobile terminal, a position location module configured for obtaining a current position of the mobile terminal, a haptic module configured for generating a plurality of haptic effects, a display unit configured for displaying the captured image as a preview image, and a controller configured for controlling the display unit to display at least one object included in the preview image and at least one object information item related to the at least one object based on the current position of the mobile terminal, and controlling the haptic module to generate at least one haptic effect indicating an occurrence of an event, wherein the event is associated with the AR function.

In another aspect of the present invention, a method of controlling a mobile terminal includes capturing an image for an augmented reality (AR) function via a camera of the mobile terminal, displaying the captured image as a preview image on a display unit of the mobile terminal, obtaining a current position of the mobile terminal via a position location module of the mobile terminal, displaying at least one object included in the preview image and at least one object information item related to at least one object based on the current position of the mobile terminal, detecting an occurrence of an event associated with the AR function, and generating at least one haptic effect, via a haptic module, indicating the occurrence of the event.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention. The above and other aspects, features, and advantages of the present invention will become more apparent upon consideration of the following description of preferred embodiments, taken in conjunction with the accompanying drawing figures. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes "module" and "unit" are used for facilitation of the detailed description of the present invention and do not have meanings or functions different from each other. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigation systems.

However, by way of non-limiting example only, further description will be provided with regard to a mobile terminal 100. It should be noted that such teachings may apply equally to other types of terminals.

Figure 1:
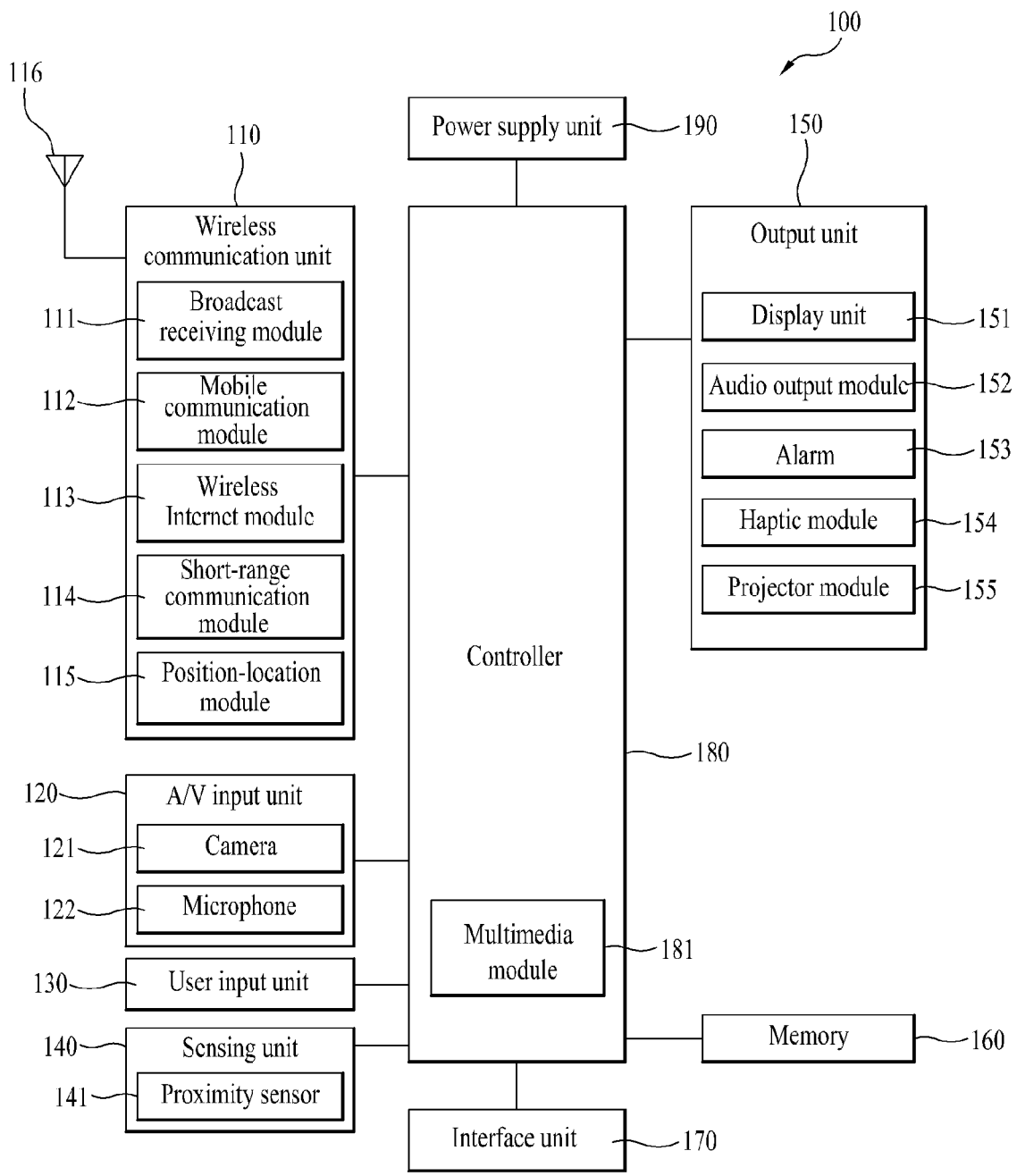
FIG. 1 is a block diagram of a mobile terminal according to an embodiment of the present invention.

FIG. 1 is a block diagram of a mobile terminal 100 in accordance with an embodiment of the present invention. Referring to FIG. 1, the mobile terminal 100 includes a wireless communication unit 110, an audio/video (A/V) input unit 120, a user input unit 130, a sensing unit 140, an output unit 150, a memory 160, an interface unit 170, a controller 180, and a power supply unit 190. Although FIG. 1 shows the mobile terminal 100 having various components, it is understood that implementing all of the illustrated components is not a requirement. More or fewer components may alternatively be implemented.

The wireless communication unit 110 includes one or more components that permit wireless communication between the mobile terminal 100 and a wireless communication system or a network within which the mobile terminal 100 is located. For example, the wireless communication unit 110 includes a broadcast receiving module 111, a mobile communication module 112, a wireless Internet module 113, a short-range communication module 114 and a position-location module 115. For non-mobile terminals, the wireless communication unit 110 may be replaced with a wired communication unit. The wireless communication unit 110 and a wired communication unit (not shown) may be commonly referred to as a communication unit.

The broadcast receiving module 111 receives a broadcast signal and/or broadcast associated information from an external broadcast managing entity via a broadcast channel. The broadcast channel may include a satellite channel and/or a terrestrial channel.

The broadcast managing entity may refer to a system that transmits a broadcast signal and/or broadcast associated information. The broadcast managing entity may be a server that generates and transmits broadcast signals and/or broadcast associated information or a server for receiving previously generated broadcast signals and/or broadcast-related information and transmitting the broadcast signals and/or the broadcast associated information to the mobile terminal 100. The broadcast signals may include not only TV broadcast signals, radio broadcast signals, and data broadcast signals, but also signals in the form of a TV broadcast signal combined with a radio broadcast signal.

The mobile terminal 100 may include at least two broadcast receiving modules 111 for providing simultaneous reception of at least two broadcast channels. The at least two broadcast receiving modules may also be used to facilitate switching of broadcast channels.

The broadcast associated information may be information about a broadcast channel, a broadcast program, or a broadcast service provider. The broadcast associated information may even be provided over a mobile communication network. In the latter case, the broadcast associated information may be received via the mobile communication module 112. Examples of broadcast associated information include an electronic program guide (EPG) of digital multimedia broadcasting (DMB) and an electronic service guide (ESG) of digital video broadcast-handheld (DVB-H).

The broadcast receiving module 111 may receive broadcast signals transmitted from various types of broadcast systems. As a non-limiting example, the broadcast systems include digital multimedia broadcasting-terrestrial (DMB- T), digital multimedia broadcasting-satellite (DMB-S), digital video broadcast-handheld (DVB-H), a data broadcasting system known as media forward link only (MediaFLO®) and integrated services digital broadcast-terrestrial (ISDB-T). The broadcast receiving module 111 may also receive multicast signals. The broadcast signals and/or the broadcast associated information received by the broadcast receiving module 111 may be stored in a suitable storage device, such as in the memory 160.

The mobile communication module 112 transmits/receives wireless signals to/from at least one of a base station, an external terminal or a server over a mobile communication network. The wireless signals may represent, for example, voice call signals, video telephony call signals or data in various forms according to the transmission/reception of text and/or multimedia messages.

The mobile communication module 112 may also be used to transmit current position information of the mobile terminal 100 obtained via the position-location module 115, which will be described later, to an external server (not shown) and to receive or download data relevant to the area in which the mobile terminal 100 is located from the external server. The downloaded data may include detailed map data of the area and an image representing the area where the mobile terminal 100 is located.

An object information item database relevant to objects located within a specific radius of the area can be included in the map data. As an example, the objects can include buildings. The object information items can include information about facilities located within the buildings, such as hospitals, restaurants, toilets, police stations, or community centers.

A real image of each area, position information of objects included within the real image and detailed information on the objects are included in the map data. The real image can include an image having the same view as a preview image captured via the camera 121 or an image corresponding to a sky view.

The wireless Internet module 113 supports Internet access for the mobile terminal 100. The wireless Internet module 113 may be internally or externally coupled to the mobile terminal 100. Suitable technologies for wireless Internet include, but are not limited to, WLAN (Wireless LAN), Wi-Fi®, Wibro® (Wireless broadband), Wimax® (World Interoperability for Microwave Access), and HSDPA (High Speed Downlink Packet Access). The wireless Internet module 113 may be replaced with a wired Internet module (not shown) in non-mobile terminals. The wireless Internet module 113 and the wired Internet module may be commonly referred to as an Internet module. Moreover, as mentioned in the foregoing description, the wireless internet module 113 can receive or download the data relevant to the area in which the mobile terminal 100 is located from the external server.

The short-range communication module 114 facilitates relatively short-range communications. Suitable technologies for short-range communication include, but are not limited to, radio frequency identification (RFID), infrared data association (IrDA), ultra-wideband (UWB), as well as networking technologies such as Bluetooth® and ZigBee®. Moreover, as mentioned in the foregoing description, the short-range communication module 114 is able to receive or download the data relevant to the area in which the mobile terminal 100 is located from the external server of another terminal located in the vicinity of the mobile terminal 100.

The position-location module 115 identifies or otherwise obtains a location of the mobile terminal 100. The position-location module 115 may obtain position information by using a global navigation satellite system (GNSS). The GNSS is a term used to describe radio navigation satellite systems configured to send reference signals capable of determining their positions on the surface of the earth or near the surface of the earth while revolving around the earth. The GNSS includes: a global position system (GPS) operated by the U.S.A.; Galileo, operated by Europe; a global orbiting navigational satellite system (GLONASS) operated by Russia; COMPASS, operated by China; and a quasi-zenith satellite system (QZSS) operated by Japan.

As a typical example of the GNSS, the position-location module 115 is a GPS module. The position-location module 115 may calculate information related to distances between one point or object and at least three satellites and information related to the time when the distance information was measured and apply trigonometry to the obtained distance information to obtain three-dimensional position information on the point or object according to the latitude, longitude, and altitude at a predetermined time. Furthermore, a method of calculating position and time information using three satellites and correcting the calculated position and time information using another satellite may also used. The position-location module 115 continues to calculate a current position in real time and to calculate velocity information based on the position information.

With continued reference to FIG. 1, the audio/video (A/V) input unit 120 may be configured to provide audio or video signal input to the mobile terminal 100. The A/V input unit 120 may include a camera 121 and a microphone 122. The camera 121 processes image frames of still pictures or video obtained by an image sensor in a photographing mode or a video telephony mode. The processed image frames may be displayed on a display unit 151.

The image frames processed by the camera 121 may be stored in the memory 160 or transmitted to an external device through the wireless communication unit 110. Optionally, the mobile terminal 100 can include two or more cameras 121, if appropriate.

The microphone 122 receives an external audio signal while the mobile terminal 100 is in a particular mode, such as a phone call mode, a recording mode and/or a voice recognition mode. The received audio signal is processed and converted into digital data. In the call mode, the processed digital data is transformed into a format transmittable to a mobile communication base station via the mobile communication module 112 and then output. Furthermore, the mobile terminal 100, and in particular the A/V input unit 120, may include a noise removing algorithm to remove noise generated during the course of receiving the external audio signal.

The user input unit 130 generates input data in response to user manipulation of an associated input device or devices. Examples of such devices include a keypad, a dome switch, a touchpad (e.g., static pressure/capacitance), a jog wheel and a jog switch. A specific example of the user input unit 130 is a touch screen in which a touchpad is combined with a display, as will be described below.

The sensing unit 140 provides status measurements of various aspects of the mobile terminal 100. For example, the sensing unit 140 may detect an open/closed status of the mobile terminal 100, relative positioning of components (e.g., a display and a keypad) of the mobile terminal 100, a change of position of the mobile terminal 100 or a component of the mobile terminal 100, a presence or absence of user contact with the mobile terminal 100, an orientation of the mobile terminal 100 and/or acceleration/deceleration of the mobile terminal 100.

As an example, the mobile terminal 100 may be configured as a slide-type mobile terminal in which the sensing unit 140 may sense whether a sliding portion of the mobile terminal 100 is open or closed. The sensing unit 140 may also sense a presence or absence of power provided by the power supply unit 190 or a presence or absence of a coupling or other connection between the interface unit 170 and an external device. The sensing unit 140 may include a proximity sensor 141.

The output unit 150 generates output relevant to the senses of sight, hearing and touch. The output unit 150 may include a display unit 151, an audio output module 152, an alarm 153, a haptic module 154, and a projector module 155.

The display unit 151 displays information processed by the mobile terminal 100. For example, when the mobile terminal 100 is in a call mode, the display unit 151 may display a user interface (UI) or a graphic user interface (GUI) associated with the call. If the mobile terminal 100 is in a video communication mode or a photograph mode, the display unit 151 may display a photographed and/or received picture, a UI or a GUI.

The display unit 151 may include a liquid crystal display (LCD), a thin film transistor liquid crystal display (TFT LCD), an organic light-emitting diode (OLED), a flexible display, or a 3-dimensional display. The mobile terminal 100 may include one or more of such displays.

The display unit 151 may have a transparent or light-transmittive type configuration, hereinafter referred to as a transparent display. A transparent OLED (TOLED) is an example of a transparent display. A rear configuration of the display unit 151 may also have the light-transmittive type configuration. In this configuration, a user is able to see an object located behind the terminal body via the area occupied by the display unit 151 of the terminal body.

At least two display units 151 may be provided. For example, a plurality of display units 151 may be provided on a single face of the mobile terminal 100 spaced apart from each other or built in one body. Alternatively, each of a plurality of display units 151 may be provided on different faces of the mobile terminal 100.

If the display unit 151 and a sensor for detecting a touch action (hereafter referred to as a 'touch sensor') are constructed in a mutual-layered structure (hereafter referred to as a 'touch screen'), the display unit 151 may be used as an input device and an output device. For example, the touch sensor may include a touch film, a touch sheet or a touchpad.

The touch sensor can be configured to convert a pressure applied to a specific portion of the display unit 151 or a variation of electrostatic capacity generated from a specific portion of the display unit 151 to an electric input signal. The touch sensor may detect a pressure of a touch as well as a touched position or magnitude of the touch.

If a touch input is made to the touch sensor, a signal(s) corresponding to the touch input is transferred to a touch controller (not shown). The touch controller processes the signal(s) and then transfers corresponding data to the controller 180. The controller 180 may determine, therefore, which portion of the display unit 151 is touched.

With continued reference to FIG. 1, a proximity sensor 141 can be provided within the mobile terminal 100 enclosed by the touch screen or around the touch screen. The proximity sensor 141 may detect a presence or non-presence of an object approaching a specific detecting surface or an object existing around the proximity sensor 141 using an electromagnetic field strength or infrared ray without mechanical contact. Accordingly, the proximity sensor 141 may have greater durability and greater utility than a contact type sensor.

The proximity sensor 141 can include a transmittive photoelectric sensor, a direct reflective photoelectric sensor, a mirror reflective photoelectric sensor, a radio frequency oscillation proximity sensor, an electrostatic capacity proximity sensor, a magnetic proximity sensor or an infrared proximity sensor. If the touch screen is an electrostatic type touch screen, the proximity sensor 141 may detect proximity of a pointer using a variation of an electric field according to the proximity of the pointer and the touch screen (touch sensor) may be classified as the proximity sensor 141.

An action in which a pointer approaches the touch screen without contacting the touch screen, yet is recognized as being located on the touch screen, is referred to as a 'proximity touch'. An action in which the pointer actually touches the touch screen is referred to as a 'contact touch'. The position on the touch screen proximity-touched by the pointer refers to the position of the pointer that vertically opposes the touch screen when the pointer performs the proximity touch.

The proximity sensor 141 may detect a proximity touch and/or a proximity touch pattern (e.g., proximity touch distance, proximity touch duration, proximity touch position, proximity touch shift state). Information corresponding to the detected proximity touch action and/or the detected proximity touch pattern may be displayed on the touch screen.

The audio output module 152 may output audio data that is received from the wireless communication unit 110 in, for example, a call-receiving mode, a call-placing mode, a recording mode, a voice recognition mode or a broadcast receiving mode. The audio output module 152 may output audio data stored in the memory 160. The audio output module 152 may output an audio signal relevant to a function (e.g., a call signal receiving sound, a message receiving sound, etc.) performed by the mobile terminal 100. The audio output module 152 may include, for example, a receiver, a speaker or a buzzer.

The alarm 153 outputs a signal for announcing an occurrence of a particular event associated with the mobile terminal 100. Typical events include a call signal reception, a message reception, a key signal input and a touch input. The alarm 153 outputs a signal for announcing the event occurrence via vibration as well as a video signal or an audio signal. The video signal is output via the display unit 151 and the audio signal is output via the audio output module 152. Hence, at least the display unit 151 or the audio output module 152 can be regarded as part of the alarm 153.

The haptic module 154 may generate various haptic effects that can be sensed by a user. Vibration is a representative tactile effect generated by the haptic module 154. Strength and pattern of the vibration generated from the haptic module 154 may be controllable. For example, vibrations differing from each other can be output by being synthesized together or can be output in sequence.

The haptic module 154 may generate various haptic effects in addition to vibration. For example, the haptic module 154 may generate an effect caused by a pin array vertically moving against skin being touched, an air injection force via an injection hole, an air suction force via a suction hole, an effect of skimming on a skin surface, an effect of contact with an electrode, an effect of electrostatic power and/or an effect of a hot/cold sense using an endothermic or exothermic device.

The haptic module 154 can be configured to provide the haptic effect via direct contact. The haptic module 154 can also be configured to enable a user to experience the haptic effect via muscular sense of a finger or an arm. Two or more haptic modules 154 can be provided according to a configuration of the mobile terminal 100.

The projector module 155 is configured to perform an image projection function. More particularly, the projector module 155 is configured to display an image that is either identical to or at least partially different from the image displayed on the display unit 151 on an external screen or wall based on a control signal from the controller 180.

The projector module 155 may include a light source (not shown) configured to generate light (e.g., a laser) for projecting an image external to the mobile terminal 100, an image producing means (not shown) for producing the image for external output using the light generated from the light source, and a lens (not shown) for enlarging the image to be output externally at a predetermined focus distance. The projector module 155 may further include a device (not shown) for adjusting a direction of the projected image by mechanically moving the lens or the entire module.

The projector module 155 may be classified as, for example, a cathode ray tube (CRT) module, a liquid crystal display (LCD) module, or a digital light processing (DLP) module based on a type of a display means. In particular, the DLP module is operated by a mechanism enabling the light generated from the light source to reflect on a digital micromirror device (DMD) chip and advantageously allows the projector module 151 to be a smaller size.

The projector module 155 may be provided in a lengthwise direction of a lateral, front or rear side of the mobile terminal 100. It is understood that the projector module 155 may be positioned at any portion of the mobile terminal 100 as necessary.

The memory 160 is generally used to store various types of data for supporting the processing, control, and storage requirements of the mobile terminal 100. Examples of such data include program instructions for applications operating on the mobile terminal 100, contact data, phonebook data, messages, audio, still pictures, and moving pictures. A recent use history or a cumulative use frequency of each data (e.g., use frequency for each phonebook, each message or each multimedia) may be stored in the memory 160. Moreover, data for various patterns of vibration and/or sound to be output when a touch input is received at the touchscreen may be stored in the memory 160.

An object information item database including information about objects, such as buildings, shops, or road signs, can be stored in the memory 160. The object information items can be searched using at least one of pattern recognition information related to an object within a preview image photographed via the camera 121 and position information of the mobile terminal 100 obtained via the position-location module 115. The object information can include at least one of relevant text information (e.g., a name of a building or shop), relevant link information (e.g., link information for the building or shop), relevant image information (e.g., an image logo for the building or shop), and relevant audio information (e.g., a logged song related to the building or shop) of the pattern-recognized object.

The object information item database stored in the memory 160 can be downloaded or updated from a database of the external server via the wireless communication unit 110. The object information item database stored in the memory 160 can include an entire portion of the database downloaded from the external server or only a portion of the database downloaded in part from the external server, depending on the storage capacity of the memory 160. The portion of the database of the external server is provided for an object located within a predetermined distance from a current position of the mobile terminal 100 or an object located in a predetermined area (e.g., administrative district) related to a current position of the mobile terminal 100.

Information related to a plurality of contact entries, including a plurality of video images related to the plurality of contact entries, may be stored in the memory 160. The information related to the contact entries may include at least a name, video image, phone number, email address, or fax number for each corresponding contact entry.

The memory 160 may include, for example, a flash memory, a hard disk, a multimedia card micro type memory, a card type memory (e.g., SD memory, XD memory, etc.), a random access memory (RAM), a static random access memory (SRAM), a read-only memory (ROM), an electrically erasable programmable read-only memory (EEPROM), a programmable read-only memory(PROM), a magnetic memory, a magnetic disk or an optical disk. The mobile terminal 100 may operate in association with a web storage that performs a storage function of the memory 160 via the Internet.

The interface unit 170 couples the mobile terminal 100 with external devices. The interface unit 170 receives data from an external device. The interface unit 170 is supplied with power and may be configured to deliver the power to elements within the mobile terminal 100. The interface unit 170 may be configured to enable data to be transferred from the mobile terminal 100 to an external device. The interface unit 170 may be configured to include a wired/wireless headset port, an external charger port, a wire/wireless data port, a memory card port, a port for coupling to a device having an identity module, an audio input/output (I/O) port, a video input/output (I/O) port or an earphone port.

The identity module is a chip or card that stores various types of information for authenticating a use authority of the mobile terminal 100 and can include a user identity module (UIM), a subscriber identity module (SIM) and/or a universal subscriber identity module (USIM). A device provided with the above identity module (hereafter referred to as an 'identity device') may be manufactured in the form of a smart card. The identity device is connectable to the mobile terminal 100 via a corresponding port.

The interface unit 170 may be configured as a passage for supplying power to the mobile terminal 100 from a cradle that is connected to the mobile terminal 100. The interface unit 170 may facilitate delivery of various command signals, which are input via the cradle by a user, to the mobile terminal 100. Various command signals input via the cradle or the power may work as a signal for recognizing that the mobile terminal 100 is correctly loaded in the cradle.

The controller 180 typically controls the overall operations of the mobile terminal 100. For example, the controller 180 performs control and processing associated with voice calls, data communications and video conferences. The controller 180 may include a multimedia module 181 that provides multimedia playback. The multimedia module 181 may be configured as part of the controller 180 or may be configured as a separate component. The controller 180 may also perform pattern recognizing processing for recognizing a handwriting input performed on the touch screen as a character and/or recognizing a picture drawing input performed on the touch screen as characters or images.

Meanwhile, the controller 180 can be configured to implement the augmented reality (hereinafter, "AR") technology. The AR is a form of virtual reality that provides one image generated from combining the real world, as seen via the eyes of a user, together with a virtual world having side information. The AR compensates the real world with a virtual world and plays a role in providing information necessary for the real world graphically. The controller 180 displays the object information item in the form of the AR.

The power supply unit 190 provides power required by the various components of the mobile terminal 100. The power may be internal power, external power, or combinations thereof Embodiments of the present invention described in the following description may be implemented within a recording medium that can be read by a computer or a computer-like device using software, hardware or combinations thereof. For hardware implementations, arrangements and embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors or electrical units for performing other functions. Such embodiments may also be implemented by the controller 180.

For a software implementation, arrangements and embodiments described herein may be implemented with separate software modules, such as procedures and functions, each of which may perform one or more of the functions and operations described herein. Software codes may be implemented with a software application written in any suitable programming language and may be stored in the memory 160 and executed by the controller 180.

Figure 2A:
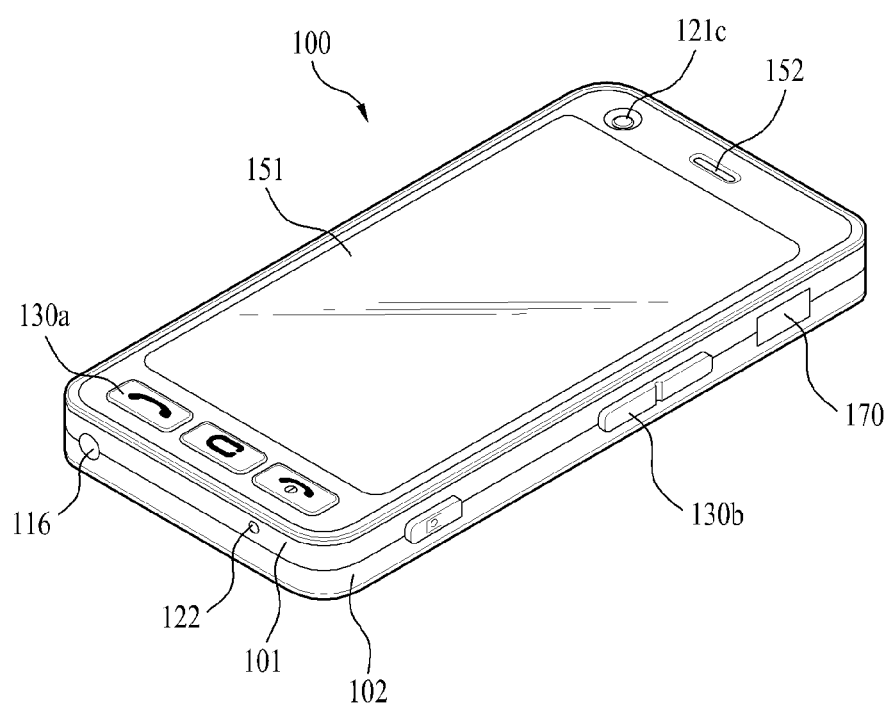
FIG. 2A is a front perspective diagram of a mobile terminal according to an embodiment of the present invention.

FIG. 2A is a front perspective view showing an example of a front of the mobile terminal 100. The mobile terminal 100 of FIG. 2A is depicted as a bar-type terminal body. However, the mobile terminal 100 may be implemented in a variety of different configurations. Examples of such configurations include a folder-type, a slide-type, a rotational-type, a swing-type and combinations thereof. For clarity, further disclosure will primarily relate to a bar-type mobile terminal 100. However such teachings apply equally to other types of mobile terminals.

The mobile terminal 100 includes a case (casing, housing, cover, etc.) that forms an exterior of the mobile terminal. The case may be divided into a front case 101 and a rear case 102. Various electric/electronic parts are provided in a space between the front case 101 and the rear case 102. A middle case may be further provided between the front case 101 and the rear case 102. The cases can be formed by injection molding of synthetic resin or may be formed of a metallic material, such as stainless steel (STS) or titanium (Ti).

The display unit 151, audio output module 152, camera 121, first and second user manipulating units 130a and 130b, microphone 122 and/or the interface unit 170 can be provided on the terminal body, and more particularly on the front case 101.

The display unit 151 occupies most of a main face of the front case 101. The audio output module 152 and the camera 121 may be provided at an area adjacent to one end portion of the display unit 151, while the first manipulating unit 130a and the microphone 122 may be provided at an area adjacent to the other, opposite end portion of the display unit 151. The second manipulating unit 130b and the interface unit 170 can be provided on lateral sides of the front and rear cases 101 and 102.

The user input unit 130 (FIG. 1) may receive a command for controlling an operation of the mobile terminal 100. The user input unit 130 may include a plurality of manipulating units, such as the first and second manipulating units 130a and 130b. The first and second user manipulating units 130a and 130b can be named a manipulating portion and may adopt any mechanism of a tactile manner that enables a user to perform a manipulation action by experiencing a tactile feeling.

Content input via the first manipulating unit 130a or the second manipulating unit 130b can be set to be different. For example, commands such as start, end and scroll can be input via the first manipulating unit 130a. Commands for adjusting volume of sound output from the audio output module 152 and for switching the display unit 151 to a touch recognizing mode can be input via the second manipulating unit 130b.

Figure 2B:
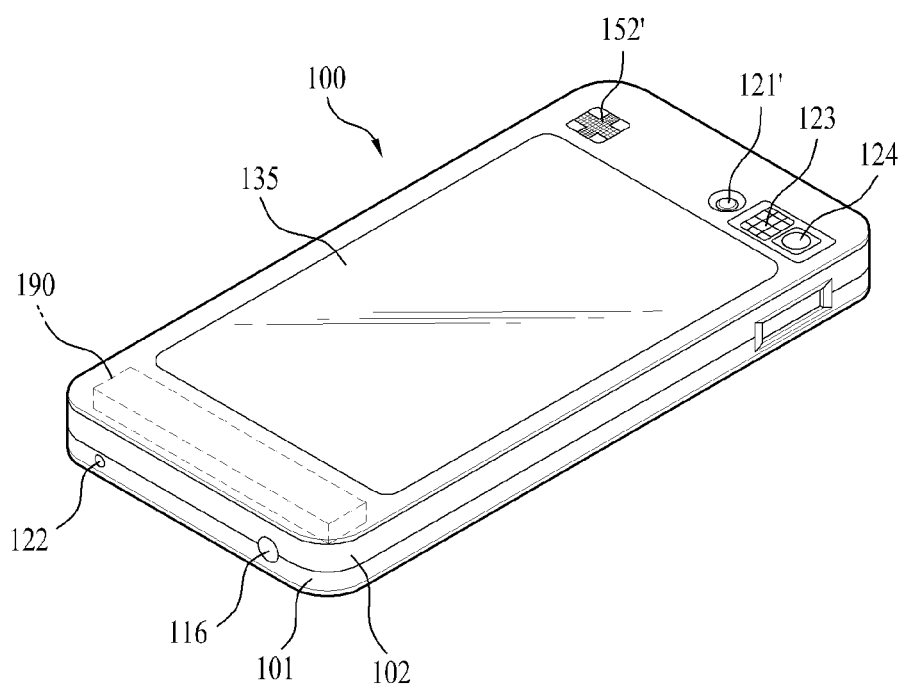
FIG. 2B is a rear perspective diagram of a mobile terminal according to an embodiment of the present invention.

FIG. 2B is a rear perspective diagram of the mobile terminal 100 shown in FIG. 2A. Other embodiments, configurations and arrangements may also be provided.

As shown in FIG. 2B, an additional camera 121' can be provided on a rear side of the terminal body, and more particularly, on the rear case 102. The camera 121' on the rear case 102 has a photographing direction that is substantially opposite to that of the camera 121 shown in FIG. 2A and may have a different resolution.

For example, the camera 121 may have a smaller number of pixels, and thereby have a relatively lower resolution, to capture and transmit an image of the user's face for a video call. On the other hand, the camera 121' may have a greater number of pixels, and thereby have a relatively greater resolution, for capturing an image of a general subject for photography without transmitting the captured image. Each of the cameras 121 and 121' can be configured to be rotated and/or popped up from the terminal body.

A flash 123 and a mirror 124 may be disposed adjacent to the camera 121'. The flash 123 projects light toward a subject when photographing the subject using the camera 121'. When a user attempts to take a picture of himself/herself (self-photography) using the camera 121', the mirror 124 enables the user to view his/her face reflected by the mirror 124.

An additional audio output module 152' can be disposed at the rear side of the terminal body. The additional audio output module 152' facilitates a stereo function in conjunction with the audio output module 152 illustrated in FIG. 2A and may be used for implementation of a speakerphone mode when communicating via the mobile terminal 100.

A broadcast signal receiving antenna 116 can be provided at a lateral side of the terminal body in addition to an antenna for communication. The antenna 116 incorporated into the broadcast receiving module 111 shown in FIG. 1 can be retractable within the terminal body.

The power supply unit 190 for supplying a power to the mobile terminal 100 may be provided in the terminal body. The power supply unit 190 can be configured to be built within the terminal body or to be detachably connected to the terminal body.

FIG. 2B also shows a touchpad 135 for detecting a touch input disposed at the rear case 102. The touchpad 135 can be a light transmittive type, similar to the display unit 151. If the display unit 151 is configured to output visual information from both its front and rear faces, it recognizes the visual information via the touchpad 135 as well. The information output from the front and rear faces can be entirely controlled by the touchpad 135. Alternatively, a display is provided at the touchpad 135 so that a touch screen can be disposed at the rear case 102.

The touchpad 135 is activated by interconnecting with the display unit 151 of the front case 101. The touchpad 135 can be disposed at the rear of, and parallel to, the display unit 151. The touchpad 135 can be of a size equal to or smaller than that of the display unit 151.

In the following description, embodiments related to a controlling method, which can be implemented in the mobile terminal 100, are explained with reference to the accompanying drawings.

Figure 3:
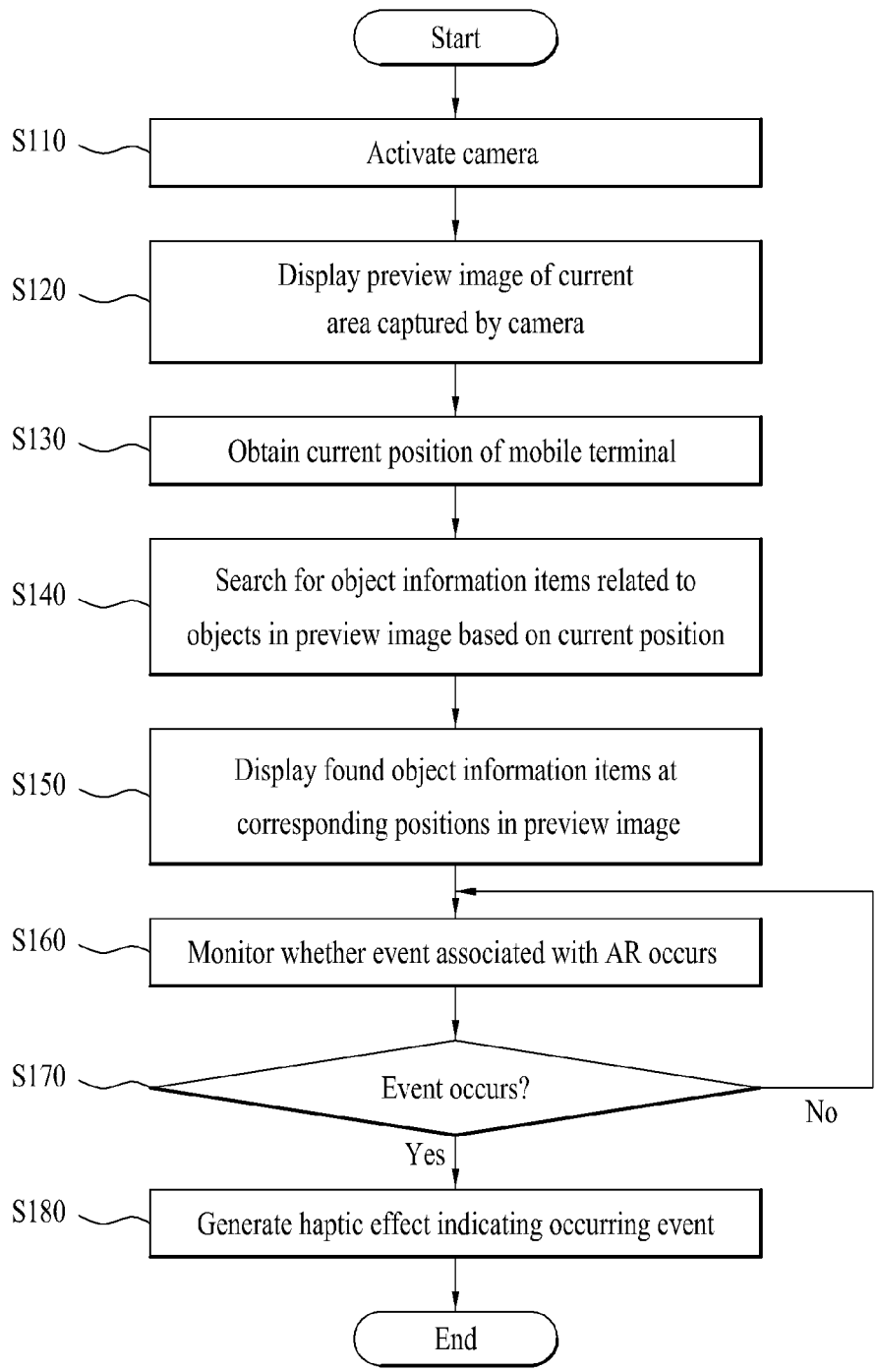
FIG. 3 is a flowchart illustrating a process for indicating an occurrence of an event associated with an augmented reality function using various haptic effects according to the present invention.

FIG. 3 is a flowchart illustrating a process for indicating an occurrence of an event associated with the AR using various haptic effects according to the present invention. Referring to FIG. 3, the controller 180 (FIG. 1) activates the camera 121 (FIG. 1) (S110) and controls the display unit 151 (FIG. 1) to display a preview image of a current area captured via the camera 121 (S120) when a menu function for the AR is selected by a user. As described previously, the display unit 151 may be a touch screen.

Subsequently, the controller 180 (FIG. 1) obtains a current position of the mobile terminal 100 via the position location module 115 (FIG. 1) (S130). More particularly, the position location module 115 receives position information including latitude, longitude, altitude and direction of the mobile terminal 100 (FIG. 1) from at least one satellite under the control of the controller 180 (FIG. 1).

Afterwards, the controller 180 (FIG. 1) searches for object information items related to at least one object included in the preview image based on the obtained current position of the mobile terminal 100 (FIG. 1) (S140). The object information items include at least a name, contact address, or location detail of a corresponding object.

The controller 180 (FIG. 1) searches map data in the memory 160 (FIG. 1) for the information related to the objects included in the preview image. The controller 180 may also access the external server via the wireless communication unit 110 (FIG. 1), search an object information item database included in the external server for the object information item related to the objects included in the preview image, and download the found object information item.

The controller 180 (FIG. 1) recognizes shapes of the objects included in the preview image and searches the map data in the memory 160 (FIG. 1) for the object information item corresponding to the recognized shapes. The controller 180 may also search the object information item database included in the external server for the object information item corresponding to the recognized shapes via the wireless communication unit 110 (FIG. 1) and download the found object information item via the wireless communication unit 110.

As described previously, once the object information items related to the objects included in the preview image are found, the controller 180 (FIG. 1) controls the display unit 151 (FIG. 1) to display the found object information items at respective positions of the corresponding objects included in the preview image for the AR (S150). While the object information items are displayed in the preview image for the AR, the controller 180 monitors whether an event related to the AR occurs (S160).

As one example, the event related to the AR can include changing the object or the object information item displayed in the preview image. As another example, the event related to the AR can include a new object or new object information item being displayed in the preview image. Additionally, the event related to the AR can include selection and dragging of a specific object or specific object information item included in the preview image. Another example of the event related to the AR is changing the preview image when a photographing view point of the camera 121 (FIG. 1) is changed, for example, via movement of the mobile terminal 100 (FIG. 1) by a user. A further event related to the AR can include changing the object information item included in the preview image based on a change of the preview image caused by changing the photographing view point of the camera 121. As another example, the event related to the AR can include outputting sound related to the AR or changing the corresponding output. Another example of the event related to the AR includes receiving a call from an external terminal when the AR preview image is displayed. A further example of an event related to the AR can include receiving a message from an external terminal while the AR preview image is displayed. As another example, the event related to the AR can include outputting a preset alarm while the AR preview image is displayed. The event related to the AR can include inputting a search word related to an object information item or a specific object included in the AR preview image. As another example, the event related to the AR can include inputting a user command for requesting a moving path to a specific object or object information item in the AR preview image.

As described previously, when the specific event related to the AR occurs (S170), the controller 180 (FIG. 1) searches the memory 160 (FIG. 1) for haptic effects, which were set previously according to types of events, that match the event and generates the haptic effects by controlling the haptic module 154 (FIG. 1) (S180). The haptic effect for different events can differ from each other by having different magnitudes and/or different patterns. Thus, a user can sense the different magnitude and/or the different pattern of the haptic effect and recognize a currently occurring event related to the AR based on the sensed haptic effect.

In the following description, a process for generating a haptic effect based on the type of event related to the AR is described in detail with reference to FIGS. 4 to 12. A process according to an embodiment of the present invention includes recognizing that at least one second object fails to be displayed on the display unit 151 (FIG. 1) because it is blocked by a specific first object in a preview image or at least one second object information item fails to be displayed on the display unit 151 (FIG. 1) because it is blocked by a specific first object information item in the preview image. The process also includes generating a haptic effect indicating a presence of the obtained at least one second object or the obtained at least one second object information item.

Figure 4:
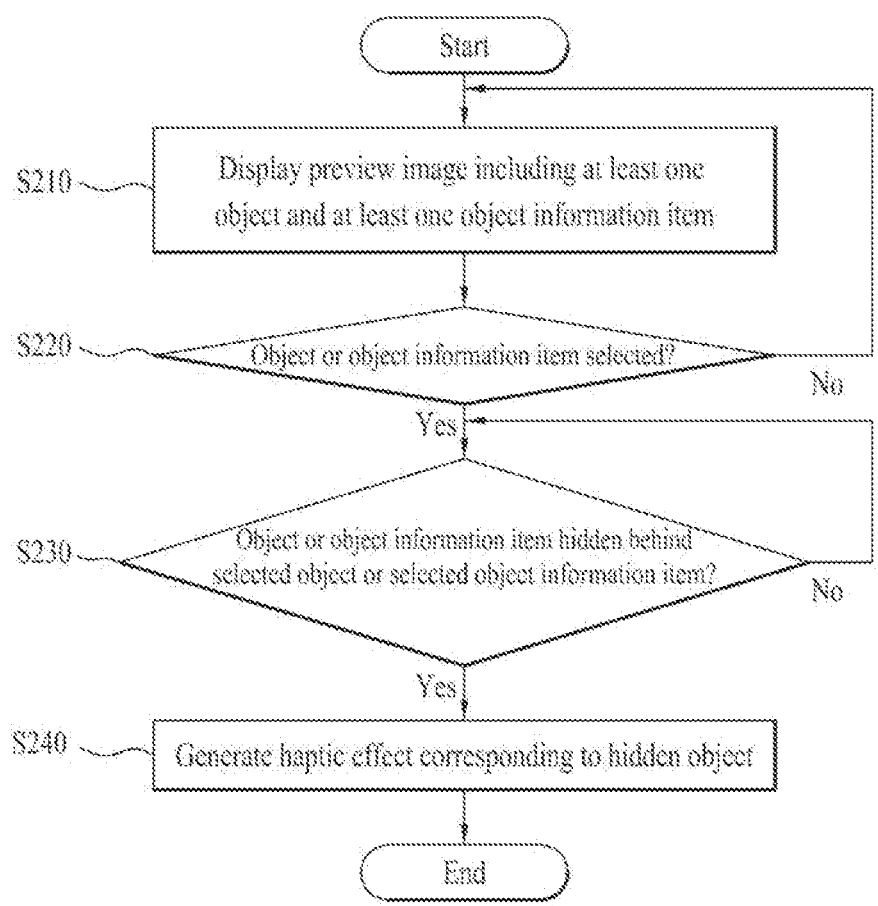
FIG. 4 is a flowchart illustrating a process for generating a haptic effect indicating an occurrence of an event associated with an augmented reality function according to an embodiment of the present invention.

An embodiment of the present invention is explained in detail with reference to FIGS. 4 to 7 as follows. FIG. 4 is a flowchart depicting a process for generating a haptic effect indicating an event associated with AR according to an embodiment of the present invention. FIGS. 5 to 7 are diagrams of screen configurations of a process for generating a haptic effect indicating an event associated with AR according to an embodiment of the present invention.

Referring to FIGS. 4 to 7, the controller 180 (FIG. 1) controls the display unit 151 (FIG. 1) to display a preview image 300A including at least one object and at least one object information item according to steps (S110) to (S150) shown in FIG. 3 (S210). The object information item displayed in the preview image 300A is a virtual information item and is changeable based on a target photographed via the camera 121 (FIG. 1).

For example, when the camera 121 (FIG. 1) is focused on a street or object, information related to the surrounding area on the street or the object information item related to the object can be displayed on the display unit 151 (FIG. 1). Alternatively, when a user desires information on a book or other object, the user can photograph the book or other object via the camera 121 and the controller searches for information or an object information item, such as an on-line bookstore price comparison or a review of the book, which can be displayed on the display unit 151. Similarly, when a user desires information related to a music disc, the user can photograph the music disk cover to search various object information items, such as music videos for songs included on the music disk or an on-line price for the music disk. When an image of a movie poster is captured via the camera 121, the controller 180 (FIG. 1) may control the display unit to display information such as a trailer or a movie review for the movie related to the movie poster.

When the first object or the first object information item in the preview image 300A is selected as the event in steps (S160) and (S170) shown in FIG. 3 (S220), the controller 180 determines whether at least one second object or at least one second object information item exists but is not displayed because it is blocked from view by the selected first object or the selected first object information item (S230).

When it is determined that the at least one second object or at least one second object information item exists but is blocked from view by the selected first object or the selected first object information item, such that the at least one second object or at least one second object information item fails to be displayed in the preview image 300A, the controller 180 controls the haptic module 154 (FIG. 1) to generate a haptic effect that indicates the existence of the blocked at least one second object or the hidden at least one second object information item (S240). When there are at least two blocked second objects or at least two blocked second object information items, the controller 180 (FIG. 1) controls the haptic module 154 to generate a number of haptic effects equal to the number of hidden objects or hidden object information items.

When the event in steps (S160) and (S170) shown in FIG. 3 is the first object or the first object information item being selected and dragged in a specific direction, the controller 180 (FIG. 1) controls the haptic module 154 (FIG. 1) to generate a haptic effect at the position corresponding to the dragged distance differing in magnitude based on the existence of the blocked at least one object or object information item. For example, if there are four objects or object information items blocked by the first object or first object information item, the controller 180 controls the haptic module 154 to generate four vibrations that differ in magnitude based on the drag input.

The type, magnitude, pattern or other features of the haptic effect generated to correspond to the blocked object or the blocked object information item can be set by a user. A separate menu can be provided on the display unit 151 (FIG. 1) to set the haptic effect type, magnitude, pattern, or other haptic effect features.

Figure 5A:
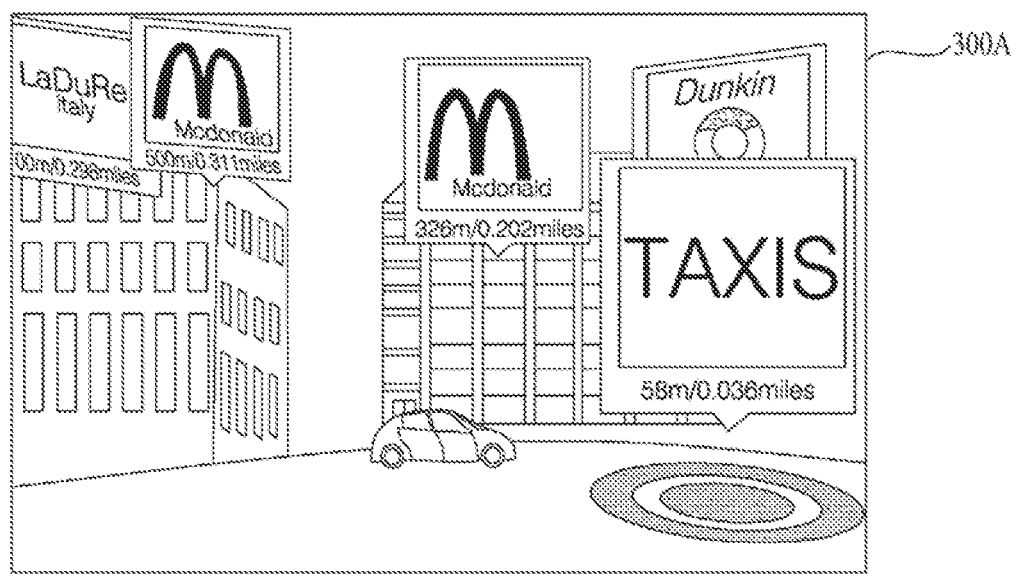
FIGS. 5 to 7 are diagrams of screen configurations of a process for generating a haptic effect indicating an event associated with an augmented reality function according to an embodiment of the present invention.
Figure 5B:
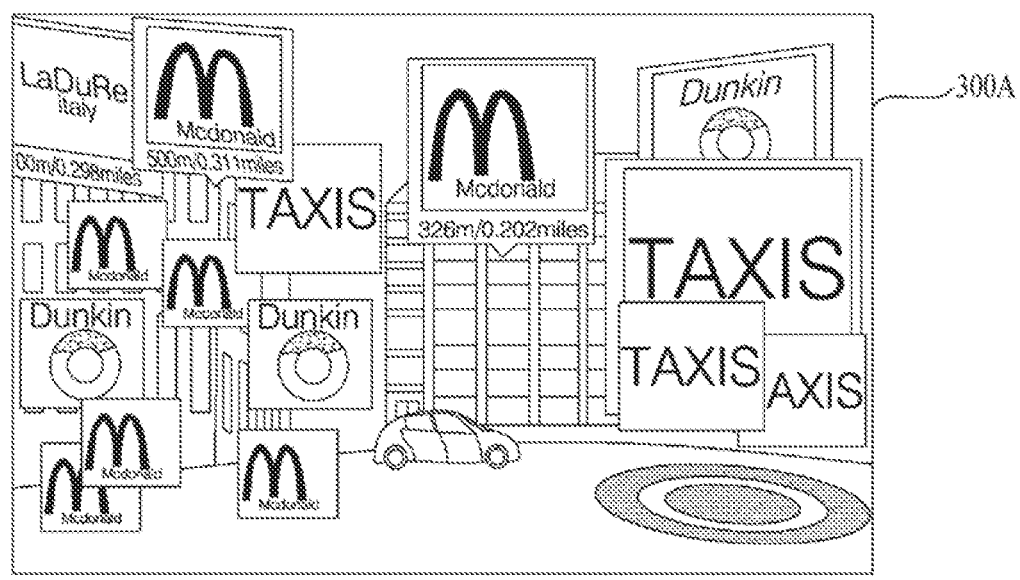

FIG. 5A shows a preview image 300A for AR in which at least one object or at least one object information item is included. Referring to FIG. 5B, the preview image 300A includes an increased number of objects or object information items, such that the objects and the object information items overlap each other or block each other from view. Accordingly, a user has difficulty selecting desired information or obtaining information indicating whether other information exists.

Figure 6A:
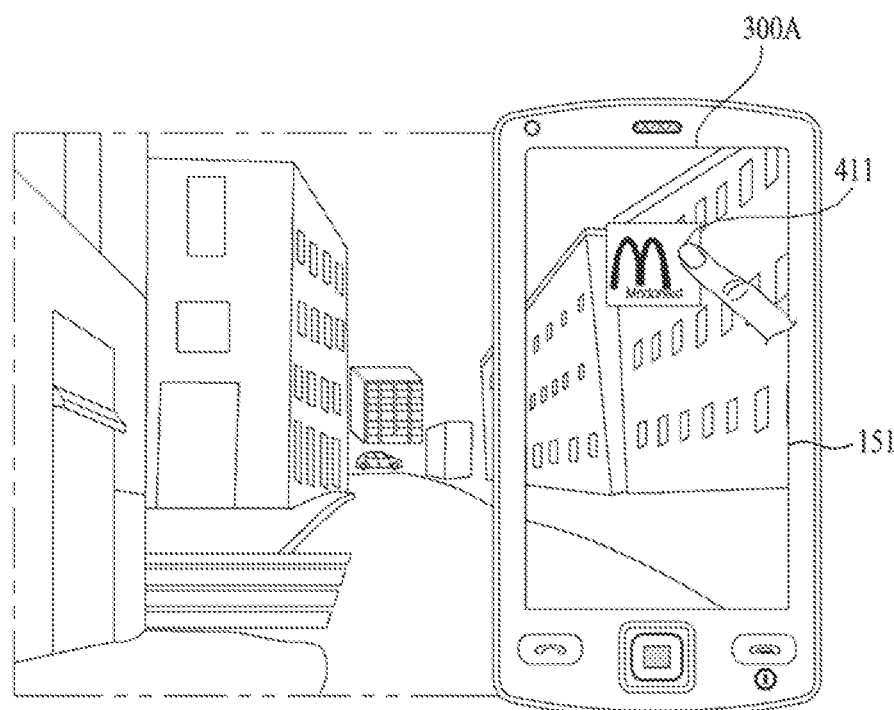
Figure 6B:
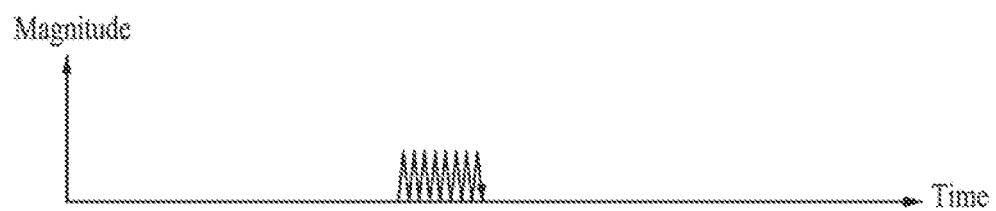

Referring to FIGS. 6A and 6B, when an object 411 in preview image 300A is touched and selected (FIG. 6A) and an object or object information item is blocked from view in the preview image 300A by the selected object 411, the controller 180 (FIG. 1) controls the haptic module 154 (FIG. 1) to generate a haptic effect, such as vibration (FIG. 6B). In other words, when an object or object information item is hidden behind or blocked from view by the selected object 411, the hidden object or object information item is not displayed in the preview image 300A. Accordingly, the vibration or other corresponding haptic effect is output by the haptic module 154 (FIG. 1) to indicate that another object or object information item exists behind the selected object 411. Similarly, when an object information item displayed in the preview image 300A is touched and selected (not shown) and an object or object information item is blocked from view in the preview image 300A by the selected object information item, the controller 180 (FIG. 1) causes the haptic module 154 to generate a corresponding haptic effect.

Figure 7A:
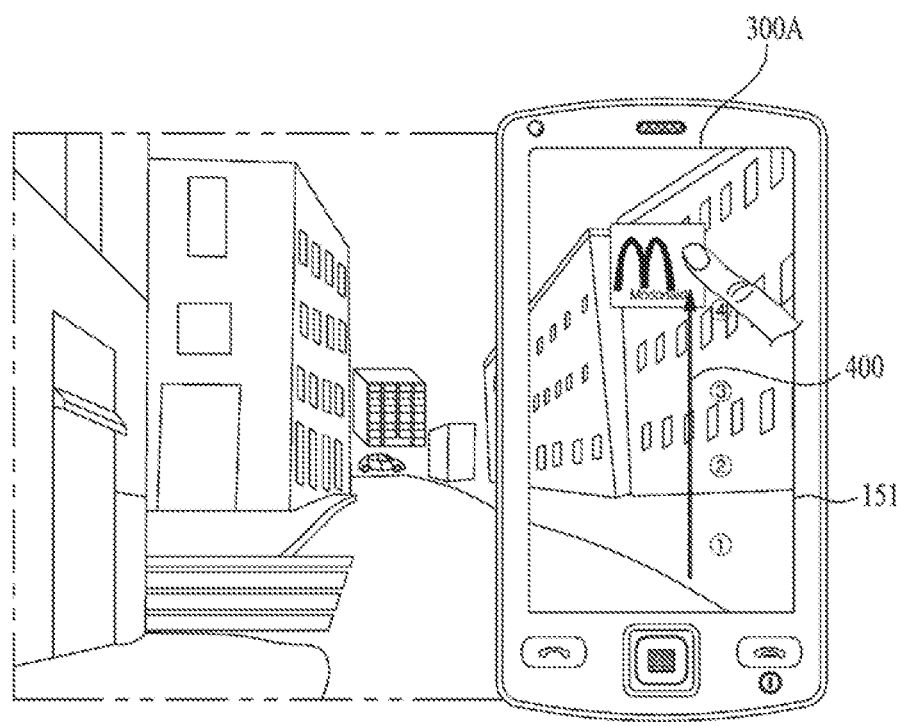
Figure 7B:
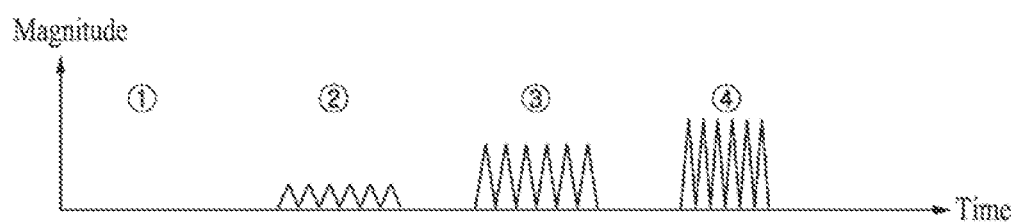

FIG. 7A depicts a drag input 400 being performed on a preview image 300A with reference to an object or object information item. Referring to FIGS. 7A and 7B, when a dragging of a selected object or object information item progresses on the preview image 300A in the direction indicated 1→2→3→4→ and objects or object information items are hidden within the progressing drag, the controller 180 (FIG. 1) controls the haptic module 154 (FIG. 1) to generate a haptic effect to indicate that the objects or object information items are hidden within the progressing drag (FIG. 7B). If one of the positions 1, 2, 3, and 4 is selected from the preview image 300A, the controller 180 controls the display unit 151 (FIG. 1) to display the object or object information item hidden at the selected position on the preview image 300A.

Figure 8:
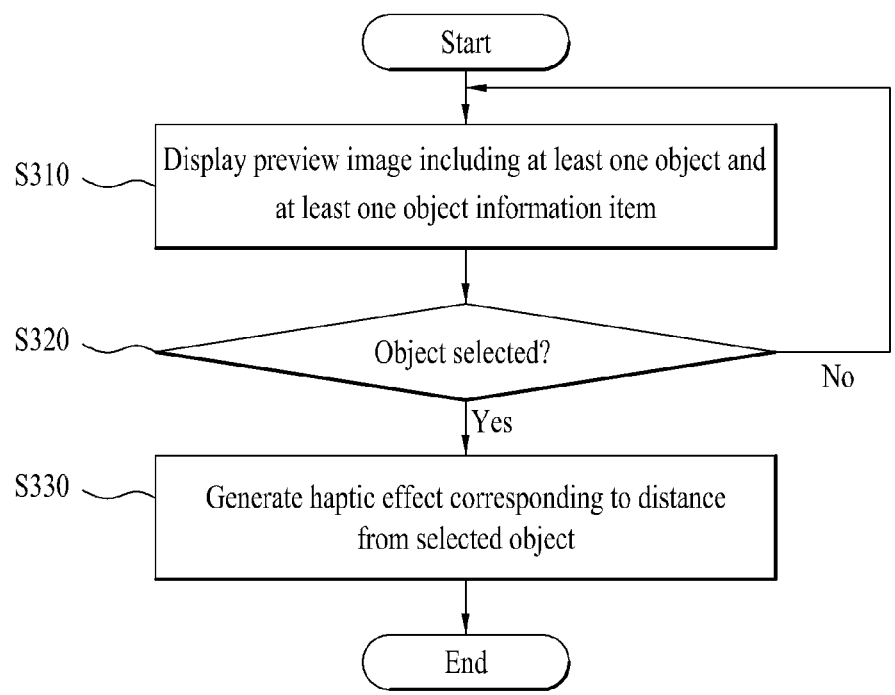
FIG. 8 is a flowchart illustrating a process for generating a haptic effect indicating an occurrence of an event associated with an augmented reality function according to an embodiment of the present invention.
Figure 9A:
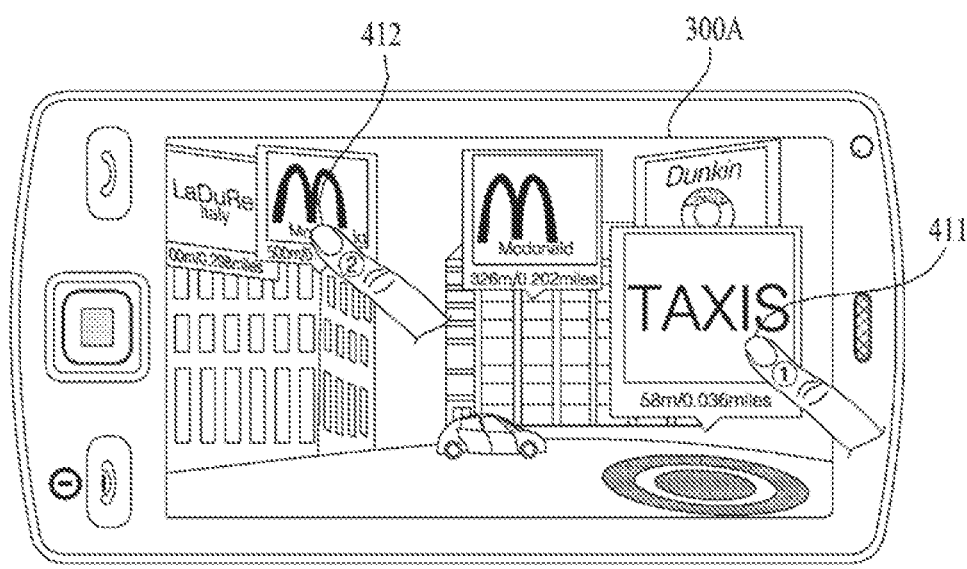
FIG. 9 is a diagram of a screen configuration of a process for generating a haptic effect indicating an occurrence of an event associated with an augmented reality function according to an embodiment of the present invention.
Figure 9B:
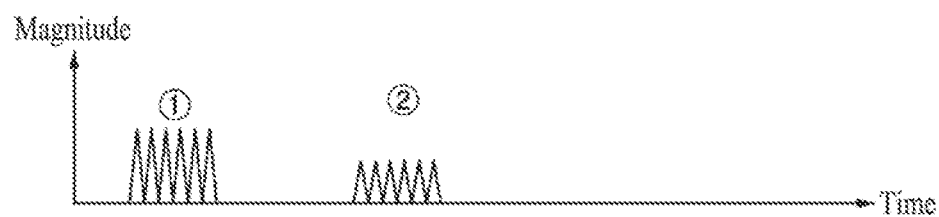

FIGS. 8-9B depict a process for generating a haptic effect indicating a distance between a terminal and a selected specific object in a preview image. FIG. 8 is a flowchart illustrating a process for generating a haptic effect based on an event associated with AR. FIG. 9 is a diagram of a screen configuration of a process for generating a haptic effect indicating an event associated with AR.

Referring to FIGS. 8-9B, the controller 180 (FIG. 1) displays a preview image 300A including at least one object and at least one object information item according to steps (S110) to (S150) shown in FIG. 3 (S310). When a first object in the preview image 300A is selected as event in steps (S160) and (S170) shown in FIG. 3 (S320), the controller 180 obtains a distance between the mobile terminal 100 (FIG. 1) and the selected first object and controls the haptic module 154 (FIG. 1) to generate a haptic effect indicating the obtained distance (S330).

For example, the controller 180 (FIG. 1) may control the haptic module 154 (FIG. 1) to generate a haptic effect that varies based on the obtained distance between the mobile terminal 100 (FIG. 1) and the selected first object. The magnitude of the haptic effect may change when the distance between the mobile terminal 100 and the selected first object is reduced.

The controller 180 (FIG. 1) may control the haptic module 154 (FIG. 1) to generate a vibration having a greater magnitude when the distance between the selected first object and the user's current position in the preview image 300A is reduced. Conversely, the controller 180 may control the haptic module 154 to generate a vibration having a smaller magnitude when the distance between the selected first object and the user's current position in the preview image 300A is increased.

Since distances to objects displayed in the preview image 300A for AR may not be easily determined, the varying haptic effects help a user to determine the approximate distance when an object is selected. According to the above process, a user can be notified of the approximate distance to a user-selected object in the AR preview image 300A based on the haptic effect generated from the AR preview image 300A.

FIG. 9A shows a first object 411 and a second object 412 situated at different distances in a selected preview image 300A. Referring to FIG. 9B, when the first object 411 is selected from the preview image 300A, a relatively stronger vibration signal "1" is output if the first object 411 is situated closer to the user's current position than the second object 412. When the second object 412, which corresponds to a building existing at a position farther away than the first object 411, is selected, a relatively weaker vibration signal "2" is output. Therefore, by generating haptic effects of differing magnitudes or patterns based on the distance between a selected object in the preview image 300A and the user's current position, the corresponding tactility notifies a user of the distance to the selected object.

FIGS. 10A-13C illustrate a process for generating a haptic effect indicating an AR event related to a change in objects or object information items included in a displayed preview image 300A. FIGS. 10A to 13C are diagrams of screen configurations of a process for generating a haptic effect indicating an event associated with the AR.

Figure 10A:
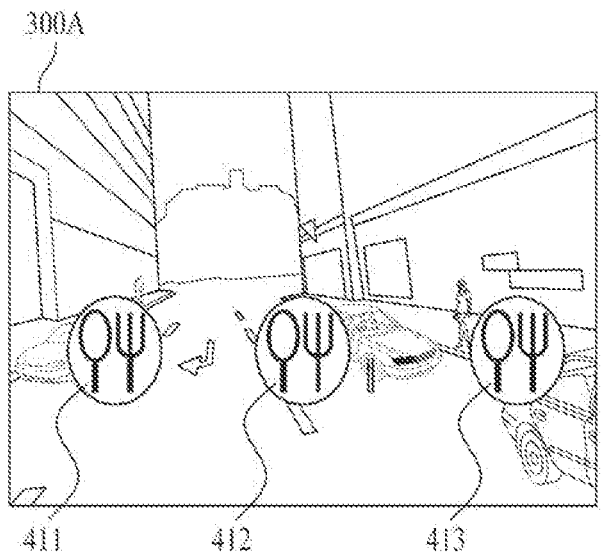
FIGS. 10 to 13 are diagrams of screen configurations of a process for generating a haptic effect indicating an occurrence of an event associated with an augmented reality function according to an embodiment of the present invention.
Figure 10B:
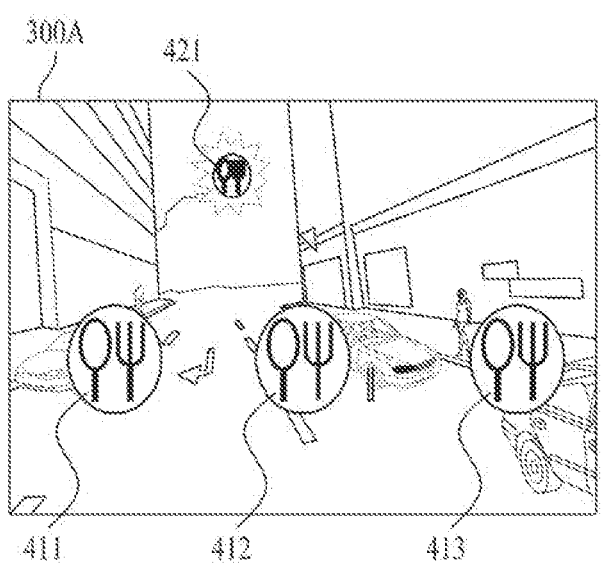
Figure 10C:
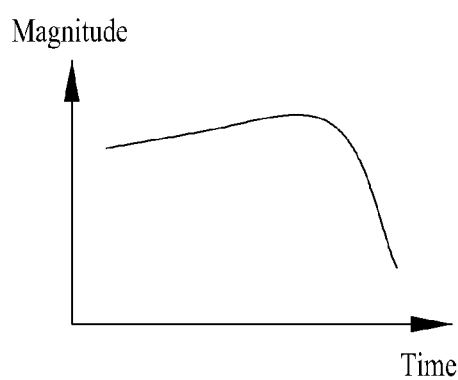

Referring to FIG. 10A, a first object information item 411, a second object information item 412 and a third object information item 413 are found and displayed in an AR preview image 300A. When a first event occurs in which a new fourth object information item 421 is found and displayed in the preview image 300A (FIG. 10B), the controller 180 (FIG. 1) searches the memory 160 (FIG. 1) for haptic effects set previously by type of event for the haptic effect corresponding to the occurring first event and controls the haptic module 154 (FIG. 1) to generate the corresponding haptic effect (FIG. 10C).

Figure 11A:
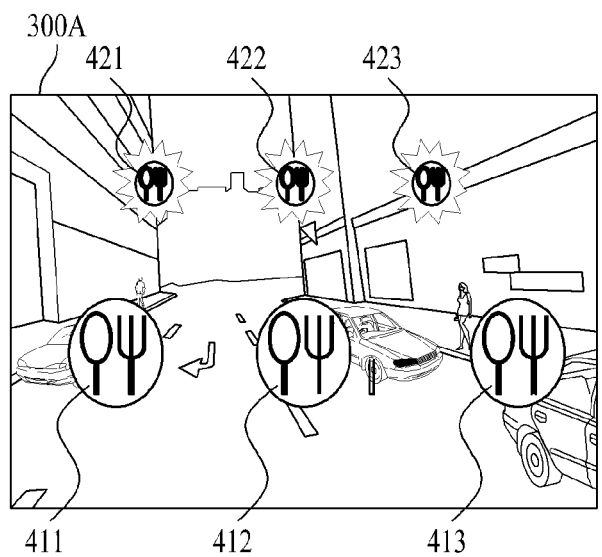
Figure 11B:
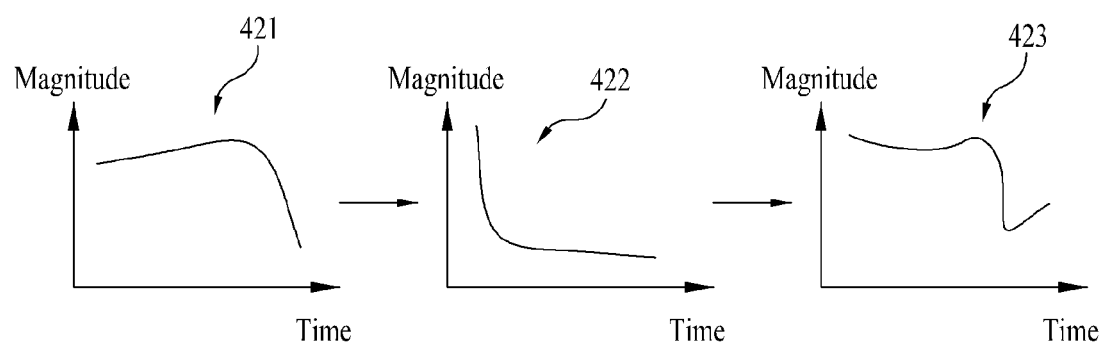

Referring to FIGS. 11A and 11B, when there is a plurality of the new object information items, the controller 180 (FIG. 1) controls the haptic module 154 (FIG. 1) to generate a number of different haptic effects in order equal to the number of the new object information items. In particular, referring to FIG. 11A, when a plurality of new object information items 421 to 423 is found and displayed in the preview image 300A, the controller 180 (FIG. 1) determines the number of the new object information items 421 to 423. Referring to FIG. 11B, the controller 180 controls the haptic module 154 (FIG. 1) to generate a number of different haptic effects in order equal to the number of the new object information items. FIG. 11B depicts the different haptic effects that correspond to the new object information items 421 to 423.

Figure 12A:
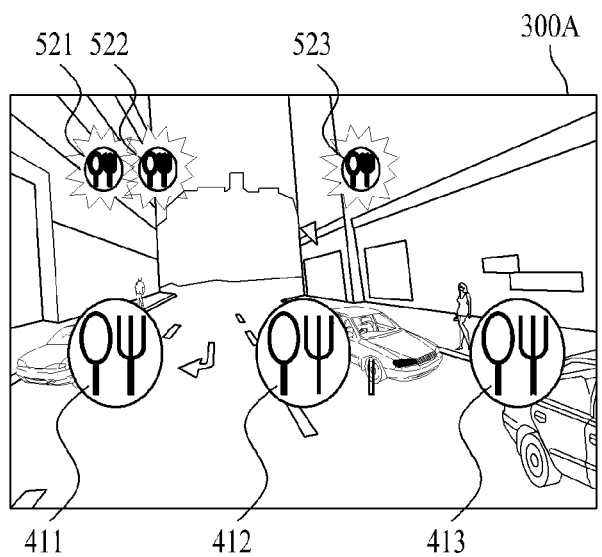
Figure 12B:
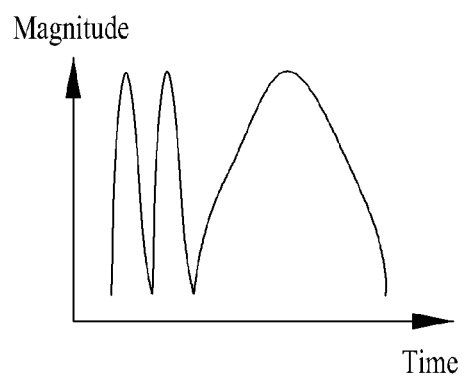

Referring to FIGS. 12A and 12B, when there is a plurality of the new object information items, the controller 180 (FIG. 1) determines distances between each of the new object information items and controls the haptic module 154 (FIG. 1) to generate the haptic effects, in order, based on the determined distances. In particular, referring to FIG. 12B, when new fourth to sixth object information items 521 to 523 are found and displayed in the preview image 300A, the controller 180 (FIG. 1) determines the respective distances between the fourth to sixth object information items 521 to 523. Referring to FIG. 12C, the controller 180 (FIG. 1) controls the haptic module 154 (FIG. 1) to generate the haptic effects corresponding to the respective determined distances.

FIG. 12B shows that the determined distances are proportional to the generation cycles of the respective haptic effects. In particular, the controller 180 (FIG. 1) controls generation of the haptic effects in the following manner. The generation cycle of the haptic effect corresponding to each of the fourth and fifth object information items 521 and 522 displayed proximate to each other is set to be shorter than the haptic effect corresponding to the sixth object information item 523, which is displayed as not being proximate to the fourth or fifth object information items 521 or 522.

Figure 13A:
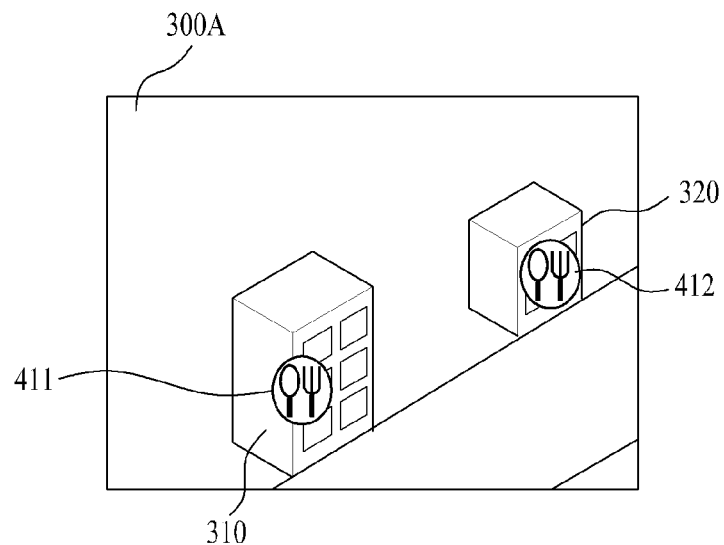
Figure 13B:
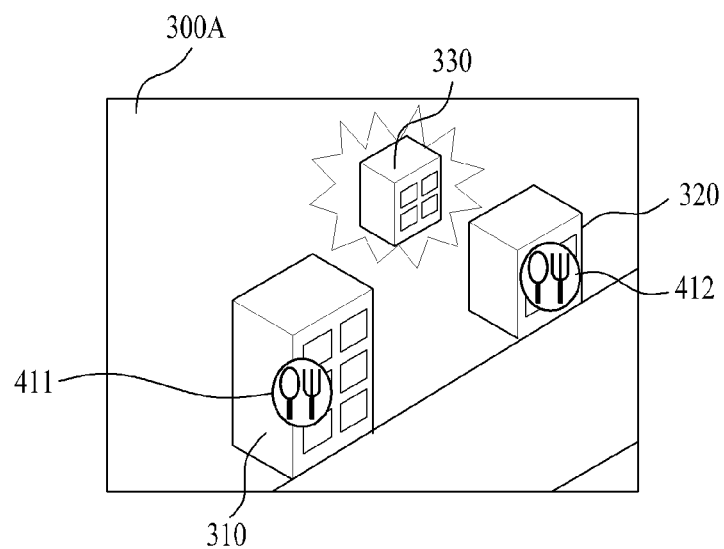
Figure 13C:
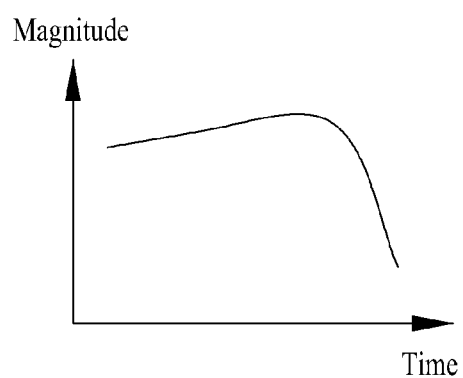

Referring to FIG. 13A, a first object 310 and a second object 320 exist in the AR preview image 300A. A first object information item 411 on the first object 310 and a second object information item 412 on the second object 320 are found and displayed in the AR preview image 300A. When a second event occurs, in which at least one new object 330 is recognized and displayed in the preview image 300A (FIG. 13B), the controller 180 (FIG. 1) searches the haptic effects set previously in the memory 160 (FIG. 1) by type of event for the haptic effect corresponding to the second event and controls the haptic module 154 (FIG. 1) to generate the corresponding haptic effect (FIG. 13C).

Meanwhile, if there is a plurality of the new objects, as described previously in relation to FIGS. 11A and 11B, the controller 180 (FIG. 1) controls the haptic module 154 (FIG. 1) to generate a number of different haptic effects in order equal to the number of the new objects (not shown). Moreover, when there is a plurality of the new object information items, as described previously in relation to FIGS. 12A and 12B, the controller 180 (FIG. 1) determines distances between each of the new object information items and controls the haptic module 154 (FIG. 1) to generate the haptic effects in order based on the obtained proximities (not shown).

Figure 14A:
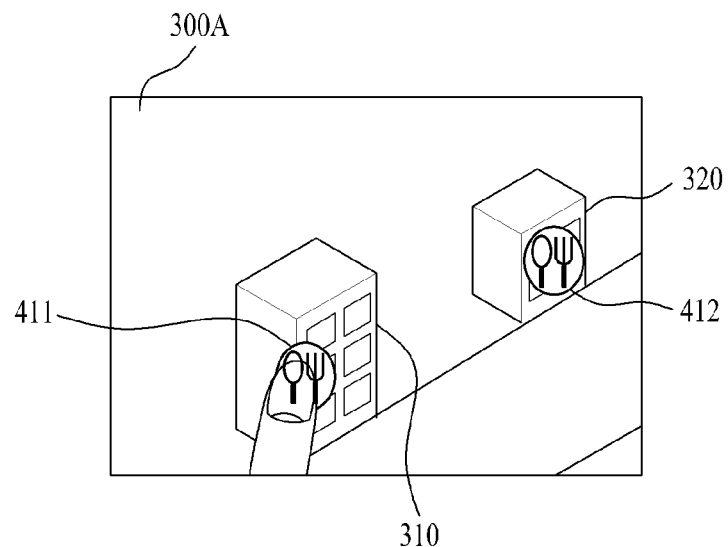
FIG. 14 is a diagram of a screen configuration of a process for generating a haptic effect indicating an occurrence of an event associated with an augmented reality function according to an embodiment of the present invention.
Figure 14B:
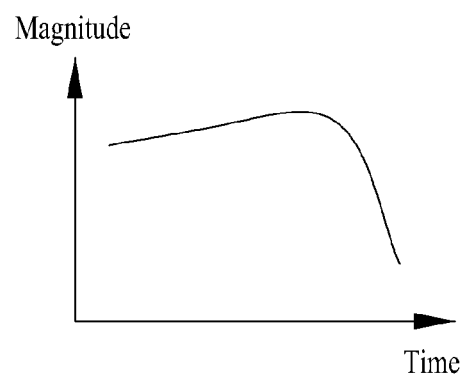

FIGS. 14A and 14B depict a process for generating a haptic effect indicating an AR event related to selecting a specific object information item from a preview image.

As previously described in FIG. 13A, a first object 310 and a second object 320 exist in an AR preview image 300A. A first object information item 411 is found and displayed on the first object 310 and a second object information item 412 is found and displayed on the second object 320. If a third event occurs, in which a specific object information item 411 is selected from the preview image 300A (FIG. 14A), the controller 180 (FIG. 1) searches the haptic effects set previously in the memory 160 (FIG. 1) by type of event for the haptic effect corresponding to the third event and controls the haptic module 154 (FIG. 1) to generate the corresponding haptic effect (FIG. 14B).

When the haptic effect corresponding to the third event is a vibration, the controller 180 (FIG. 1) controls the display unit 151 (FIG. 1) to display a shape of the selected object information item 411 as being shaken by the vibration (not shown) while the haptic effect corresponding to the third event is generated. The controller 180 controls the haptic module 154 (FIG. 1) to generate the haptic effect indicating that the specific object has been selected upon selection of the specific object from the preview image 300A.

FIGS. 15A-15D depict a process for generating a haptic effect indicating an AR event related to a change of a preview image due to a changed photographing view point of the camera 121.

Figure 15A:
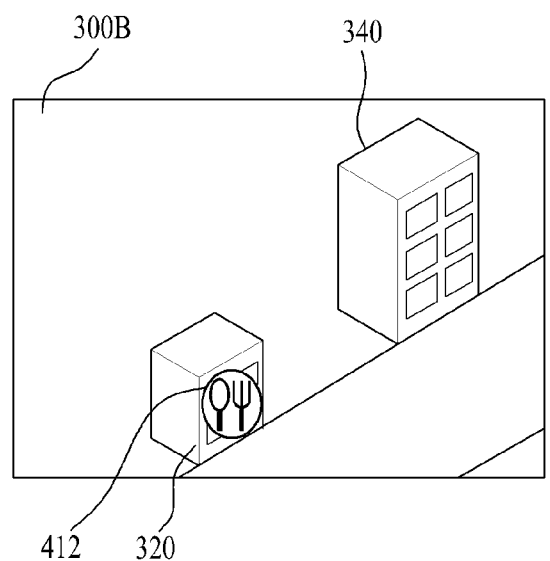
FIG. 15 is a diagram of a screen configuration of a process for generating a haptic effect indicating an occurrence of an event associated with an augmented reality function according to an embodiment of the present invention.
Figure 15B:
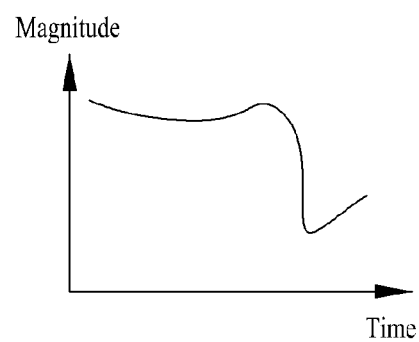
Figure 15C:
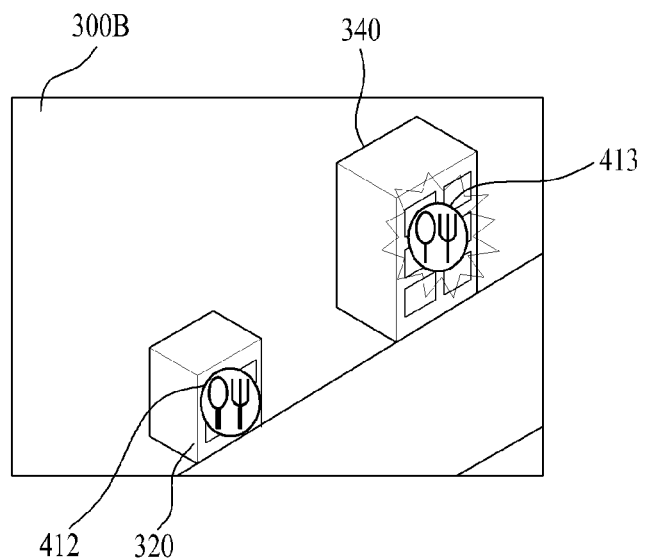

As previously described in FIG. 13A, a first object 310 and a second object 320 exist in an AR preview image 300A. A first object information item 411 is found and displayed on the first object 310 and a second object information item 412 is found and displayed on the second object 320. If a fourth event occurs, in which the first preview image 300A is changed into a second preview image 300B due to a change in a photographing view point of the camera 121 (FIG. 1) (FIG. 15A), the controller 180 (FIG. 1) searches the haptic effects set previously in the memory 160 (FIG. 1) by type of event for the haptic effect corresponding to the fourth event and controls the haptic module 154 (FIG. 1) to generate the corresponding haptic effect (FIG. 15B).

Figure 15D:
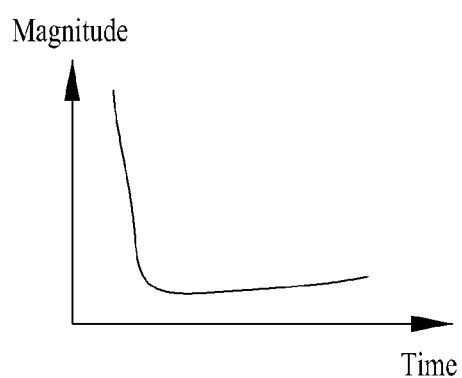

If a fifth event occurs, in which a new object 340 and a new object information item 413 on the new object 340 are found and displayed in the second preview image 300B (FIG. 15C), the controller 180 (FIG. 1) searches the haptic effects set previously in the memory 160 (FIG. 1) by type of event for the haptic effect corresponding to the fifth event and controls the haptic module 154 (FIG. 1) to generate the corresponding haptic effect (FIG. 15D).

Figure 16A:
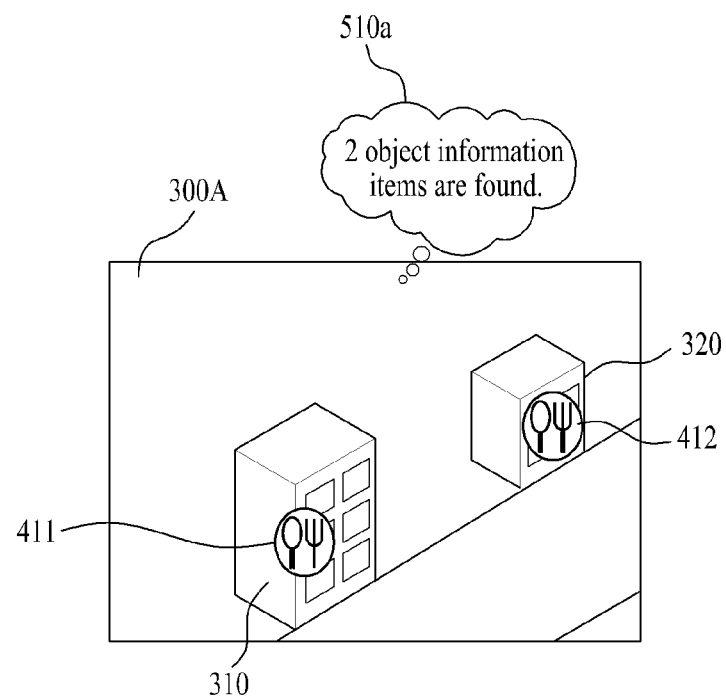
FIG. 16 is a diagram of a screen configuration of a process for generating a haptic effect indicating an occurrence of an event associated with an augmented reality function according to an embodiment of the present invention.
Figure 16A:
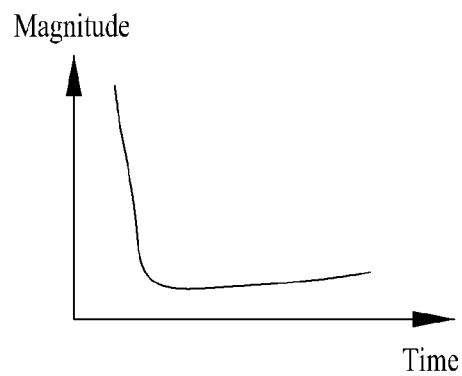
Figure 16B:
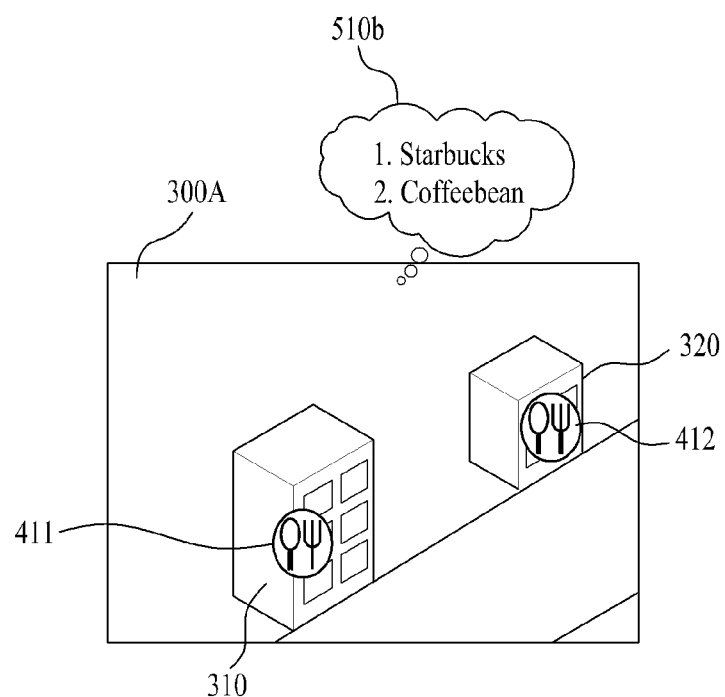
Figure 16B:
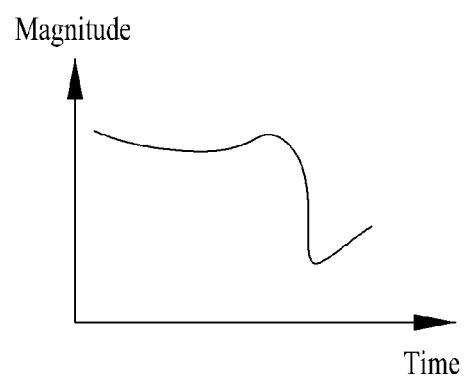

FIGS. 16A-16B depict a process for generating a haptic effect when a sound is output indicating an occurrence of an AR event. Referring to FIG. 16A, a first object 310 and a second object 320 exist in an AR preview image 300A. A first object information item 411 is found and displayed on the first object 310 and a second object information item 412 is found and displayed on the second object 320. A first sound 510a related to the AR including the first and second object information items 411 and 412 is output to indicate that two object information items are found.

If a sixth event occurs, in which the first sound 510a related to the AR is output via the audio output module 152 (FIG. 1), the controller 180 (FIG. 1) searches the haptic effects set previously in the memory 160 (FIG. 1) by type of event and controls the haptic module 154 (FIG. 1) to generate the haptic effect corresponding to the sixth event. More particularly, the controller 180 controls the haptic module 154 to generate the haptic effect corresponding to the sixth event while the first sound 510a is being output.

Referring to FIG. 16B, if a seventh event occurs, in which the first sound 510a is changed into a second sound 510b while the haptic effect corresponding to the sixth event is generated, the controller 180 (FIG. 1) searches the haptic effects set previously in the memory 160 (FIG. 1) by type of event and controls the haptic module 154 (FIG. 1) to generate the haptic effect corresponding to the seventh event.

Figure 17A:
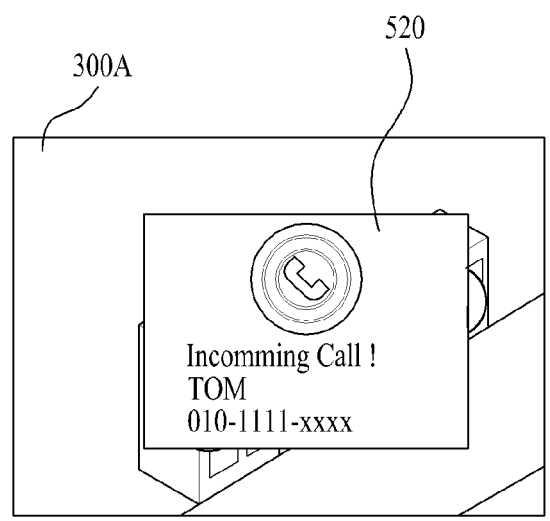
FIGS. 17 to 19 are diagrams of screen configurations of a process for generating a haptic effect indicating an occurrence of an event associated with an augmented reality function according to an embodiment of the present invention.
Figure 17B:
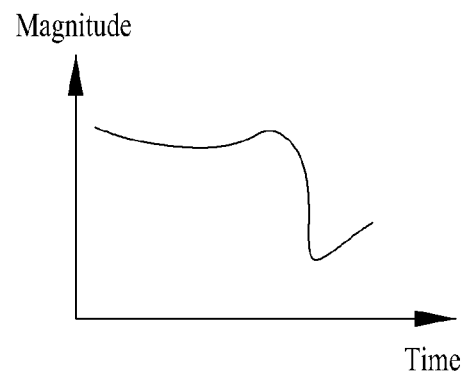
Figure 18A:
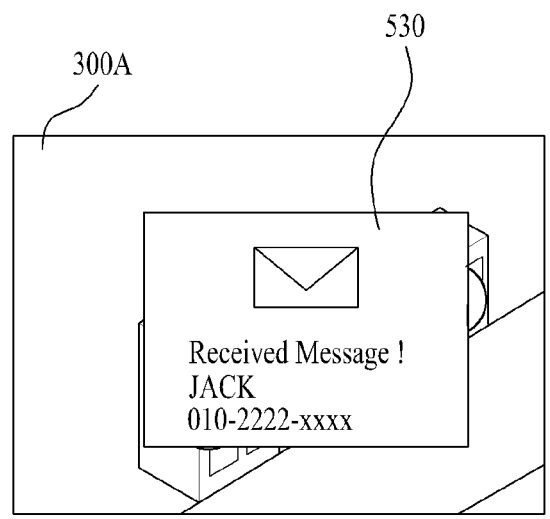
Figure 18B:
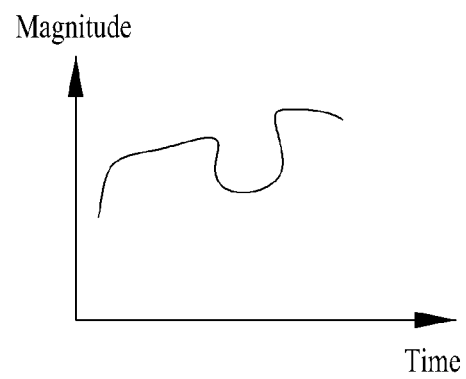
Figure 19A:
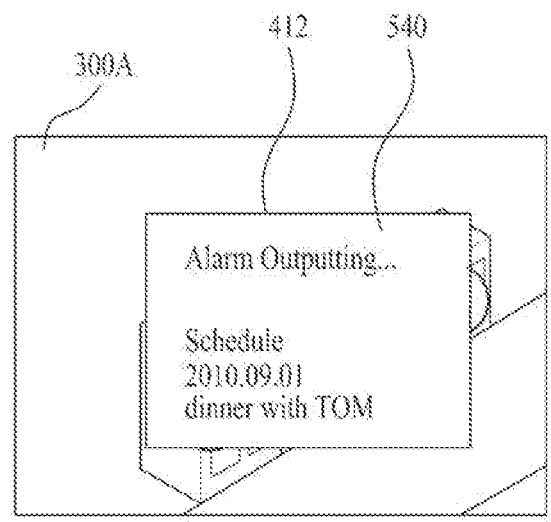
Figure 19B:
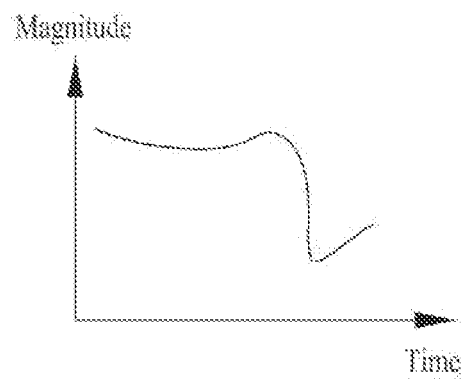

FIGS. 17-19 depict a process for generating a haptic effect when an external event, such as a message reception or an alarm output, occurs while a preview image for the AR is displayed.

As previously disclosed in FIG. 13A, a first object 310 and a second object 320 exist in an AR preview image 300A. A first object information item 411 is found and displayed on the first object 310 and a second object information item 412 is found and displayed on the second object 320.

If an eighth event occurs, in which a call 520 (FIG. 17A) is received from another terminal via the wireless communication unit 110 (FIG. 1), the controller 180 (FIG. 1) searches the haptic effects set previously in the memory 160 (FIG. 1) by type of event for the haptic effect corresponding to the eighth event and controls the haptic module 154 (FIG. 1) to generate the corresponding haptic effect (FIG. 17B).

If a ninth event occurs, in which a message 530 (FIG. 18A) is received from another terminal via the wireless communication unit 110 (FIG. 1), the controller 180 (FIG. 1) searches the haptic effects set previously in the memory 160 (FIG. 1) by type of event for the haptic effect corresponding to the ninth event and controls the haptic module 154 (FIG. 1) to generate the corresponding haptic effect (FIG. 18C).

If a tenth event occurs, in which an alarm 540 (FIG. 19B) previously registered with the memory 160 (FIG. 1) is output, the controller 180 (FIG. 1) searches the haptic effects set previously in the memory 160 (FIG. 1) by type of event for the haptic effect corresponding to the tenth event and controls the haptic module 154 (FIG. 1) to generate the corresponding haptic effect (FIG. 19C).

FIGS. 20-23 depict a process for generating a haptic effect indicating an AR related to input of a command to search for a specific object and/or a specific object information item. FIGS. 20-23 are diagrams of screen configurations of a process for generating a haptic effect indicating an event associated with the AR.

Figure 20A:
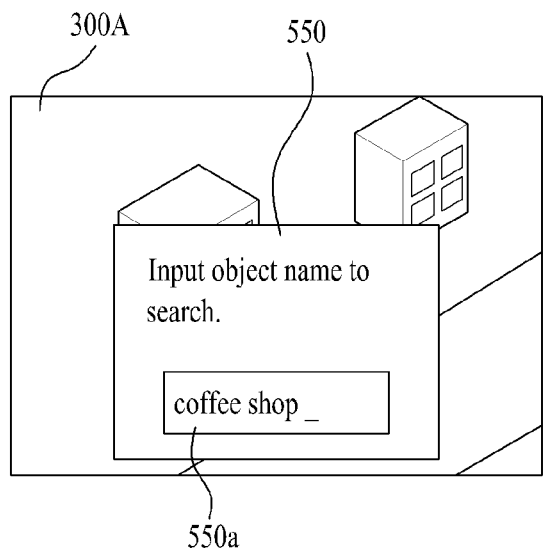
FIGS. 20 to 23 are diagrams of screen configurations of a process for generating a haptic effect indicating an occurrence of an event associated with an augmented reality function according to an embodiment of the present invention.

Referring to FIG. 20A, a search window 550 for receiving input to search for a user-specific object and/or a user-specific object information item is displayed in the first preview image 300A for the AR. A specific search word 550a is input into the search window 550.

Figure 20B:
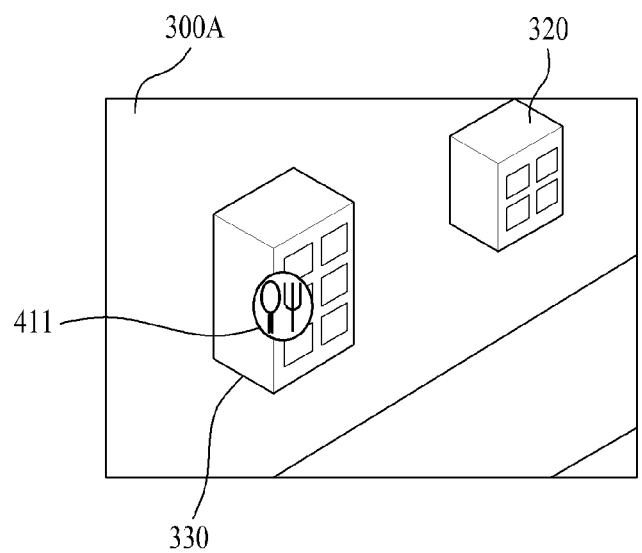
Figure 20C:
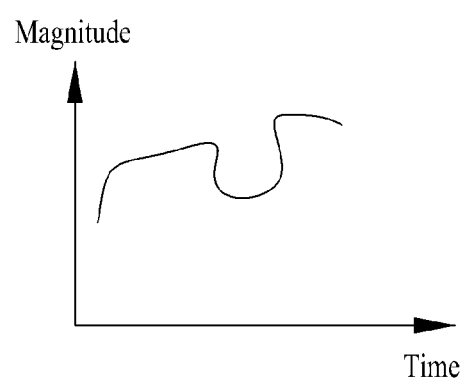

If an eleventh event occurs, in which a command to search for a specific object and/or a specific object information item is input, as indicated by the specific search word 550a, the controller 180 (FIG. 1) searches for an object 310 and/or object information item 411 corresponding to the search command using map data (FIG. 20B). If the object 310 and/or object information item 411 corresponding to the search command is found to exist in the first preview image 300A, the controller 180 (FIG. 1) searches the haptic effects set previously in the memory 160 (FIG. 1) for the haptic effect indicating that the object 310 and/or object information item 411 corresponding to the search command exists in the first preview image 300A and controls the haptic module 154 (FIG. 1) to generate the corresponding haptic effect (FIG. 20C). Moreover, while the corresponding haptic effect is being generated, the controller 180 (FIG. 1) may control the display unit 151 to display a shape of the found object information item 411 as being shaken by the vibration (not shown) while the haptic effect corresponding to the eleventh event is generated.

Figure 21A:
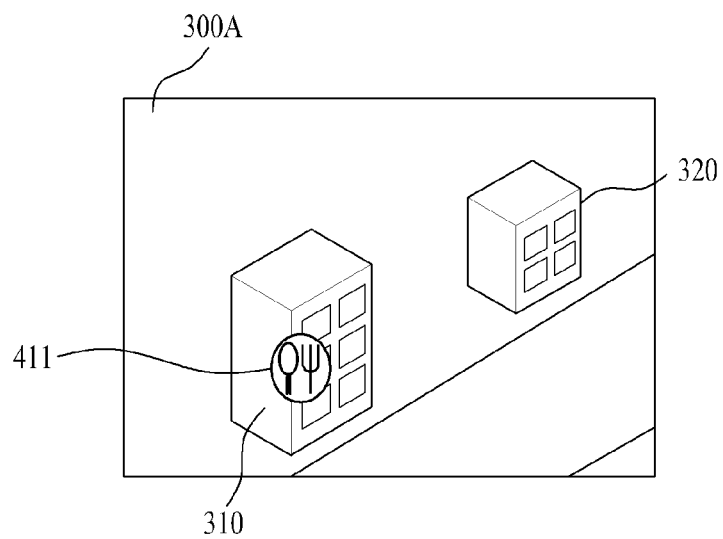
Figure 21B:
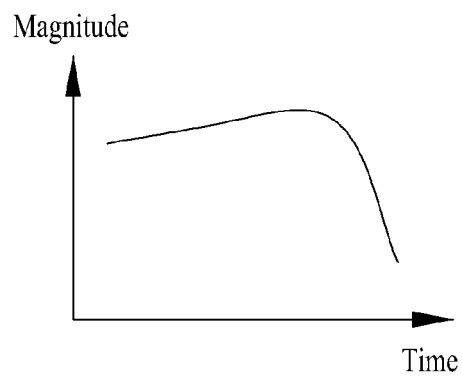

Meanwhile, referring to FIG. 21A, as a distance between the object 310 or object information item 411 found in FIG. 20B and the mobile terminal 100 (FIG. 1) decreases, the controller 180 (FIG. 1) changes the magnitude of the haptic effect. More particularly, as the distance between the found object 310 or object information item 411 and the mobile terminal 100 decreases (FIG. 21A), the controller 180 controls the haptic module 154 (FIG. 1) to increase the magnitude of the haptic effect (FIG. 21B) to notify a user that the user is getting closer to the object 310 or object information item 411.

Referring to FIGS. 22A-22D, when an object and/or object information item for which a user inputs a search exists but is not situated in a current preview image 300A, the controller 180 (FIG. 1) controls the haptic module 154 (FIG. 1) to generate a haptic effect indicating a direction in which the corresponding object and/or object information item is situated.

Figure 22A:
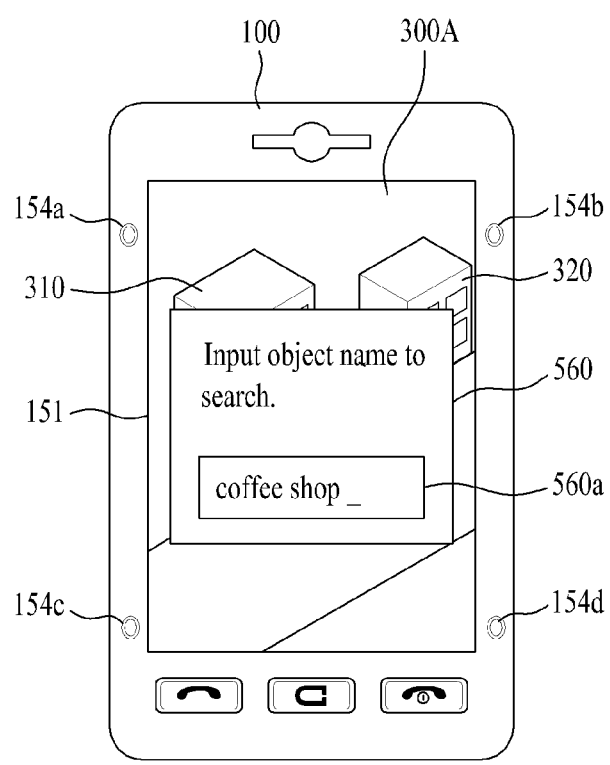

FIG. 22A depicts a plurality of haptic modules 154a, 154b, 154c and 154d included in a body of the mobile terminal 100 (FIG. 1). As depicted in FIG. 22A, a first haptic module 154a is positioned at an upper/left portion of the body of the mobile terminal 100 and a second haptic module 154b is positioned at an upper/right portion of the body of the mobile terminal 100. The first and second haptic modules 154a and 154b are configured to generate haptic effects 10R (FIG. 22B) having left-to-right directionality and 10L (not shown) having right-to-left directionality under the control of the controller 180 (FIG. 1).

The controller 180 (FIG. 1) controls the first and second haptic modules 154a and 154b to generate the haptic effect having the left-to-right or right-to-left directionality by adjusting the magnitude of the haptic effect generated from each of the first and second haptic modules 154a and 154b. For example, the controller 180 controls the first and second haptic modules 154a and 154b to generate the haptic effect having the left-to-right directionality by controlling the first haptic module 154a to generate a haptic effect having a relatively weak magnitude and by controlling the second haptic module 154b to generate a haptic effect having a relatively strong magnitude.

Referring again to FIG. 22A, a third haptic module 154c is positioned at a lower/left portion of the body of the mobile terminal 100 (FIG. 1) and a fourth haptic module 154d is positioned at a lower/right portion of the body of the mobile terminal 100. Accordingly, the first and third haptic modules 154a and 154c are configured to generate, for example, a haptic effect having a top-to-bottom directionality along a left side of the body of the mobile terminal 100 and the second and fourth haptic modules 154b and 154d are configured to generate, for example, a haptic effect having a top-to-bottom directionality along a right side of the body of the mobile terminal 100.

If a twelfth event occurs, in which a command 560a to search for an object information item 440 related to a specific object 350 is input, the controller 180 (FIG. 1) checks whether the object 350 and/or the object information item 440 exists in a current preview image 300A. If the object 350 and/or the object information item 440 is found to exist in the current preview image 300A, the controller 180 performs the process shown in FIGS. 20B and FIG. 20C. If, however, the object 350 and/or the object information item 440 is found to exist but is not situated in the current preview image 300A, the controller 180 determines a position of the object 350 and/or the object information 440 and controls a plurality of haptic modules of the first to fourth haptic modules 154a, 154b, 154c and 154d to generate a haptic effect, such as the haptic effect 10R, indicating the direction in which the object 350 and/or the object information item 440 is situated in relation to the preview image 300A.

Figure 22B:
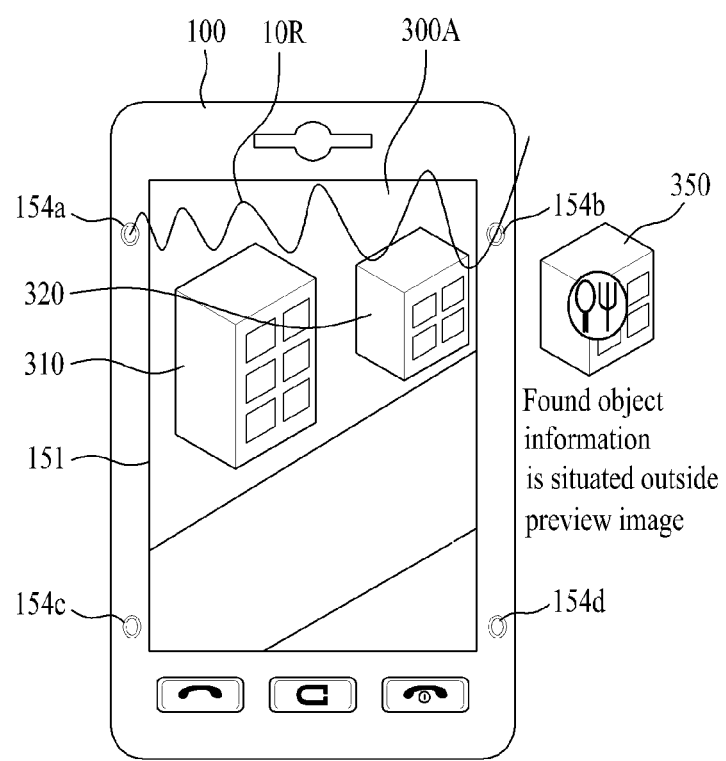
Figure 22C:
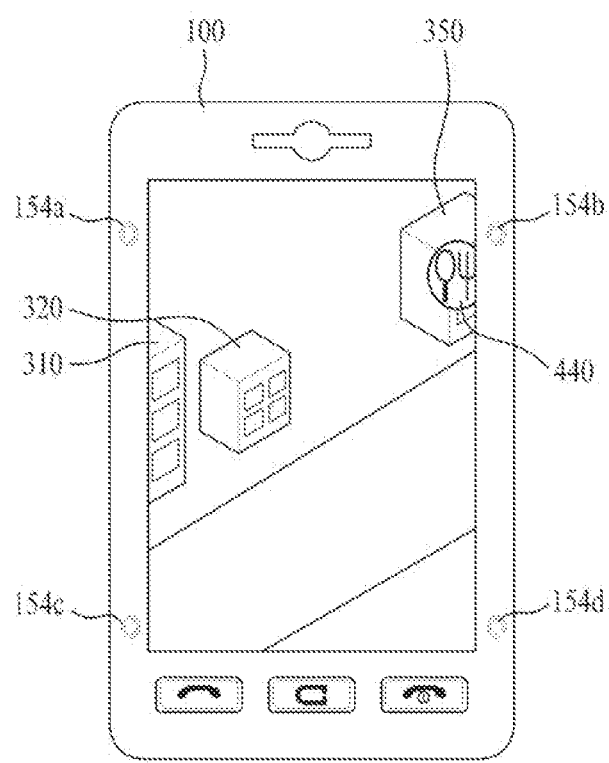
Figure 22D:
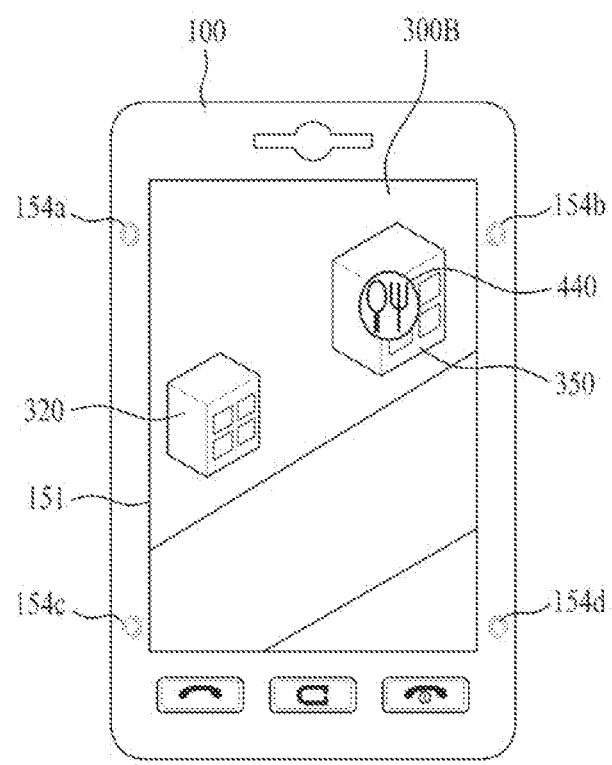

Referring to FIG. 22B, as an example, an actual position of the object 350 and/or the object information item 440 is depicted to the right side of the mobile terminal 100. Accordingly, the controller 180 (FIG. 1) controls the haptic module 154 (FIG. 1) to generate the haptic effect 10R indicating a right direction to instruct a user to lead a photographing view point of the camera 121 (FIG. 1) to the right. As the photographing view point of the camera 121 changes to the right (FIG. 22C), when a second preview image 300B that includes the object 350 is displayed, the controller searches for the object information item 440 on the object 350 and displays the found object information item 440 (FIG. 22D).

Figure 23A:
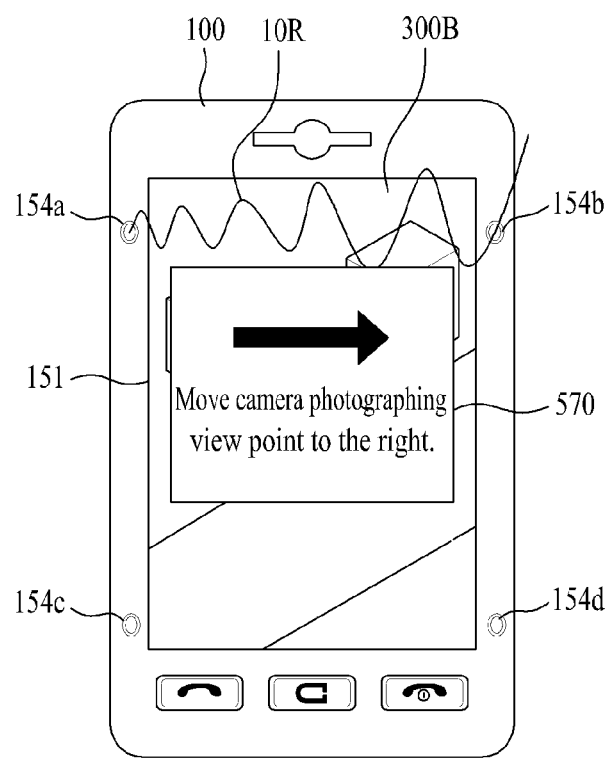
Figure 23B:
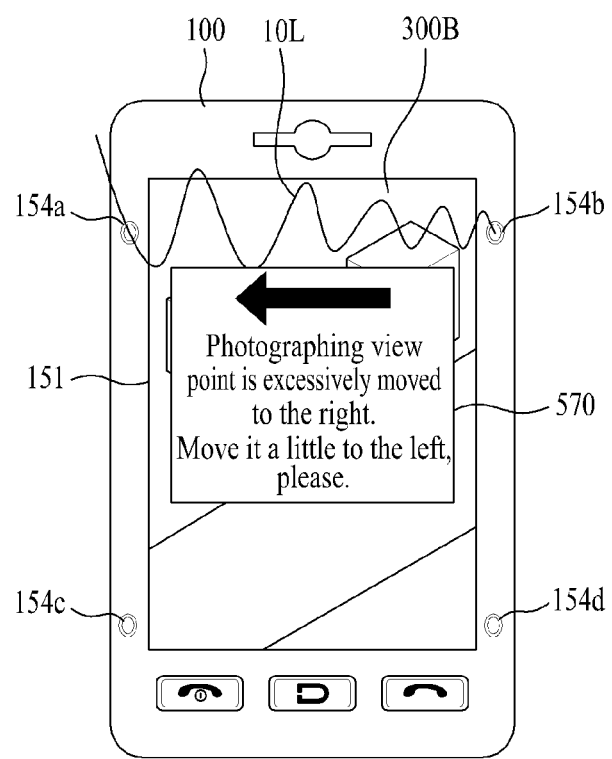
Figure 23C:
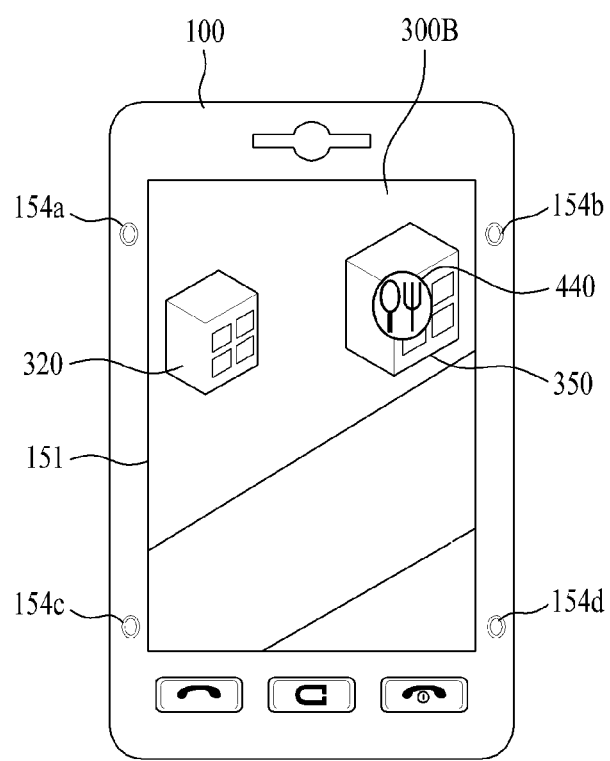

Moreover, referring to FIGS. 23A to FIG. 23C, when the actual position of the object 350 and/or the object information item 440 the user wants to search for in FIG. 22 does not exist in the first preview image 300A, the controller 180 (FIG. 1) may control the display unit 151 to display an information item 570 for leading the user to direct the view point of the camera 121 (FIG. 1) to the actual position of the object 350 and/or the object information item 440.

Figure 24A:
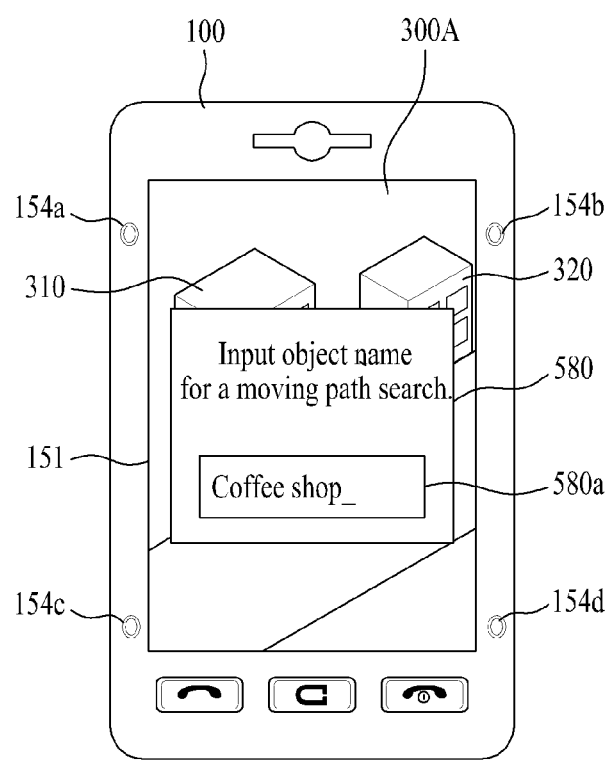
FIG. 24 is a diagram of a screen configuration of a process for generating a haptic effect indicating an occurrence of an event associated with an augmented reality function according to an embodiment of the present invention.
Figure 24B:
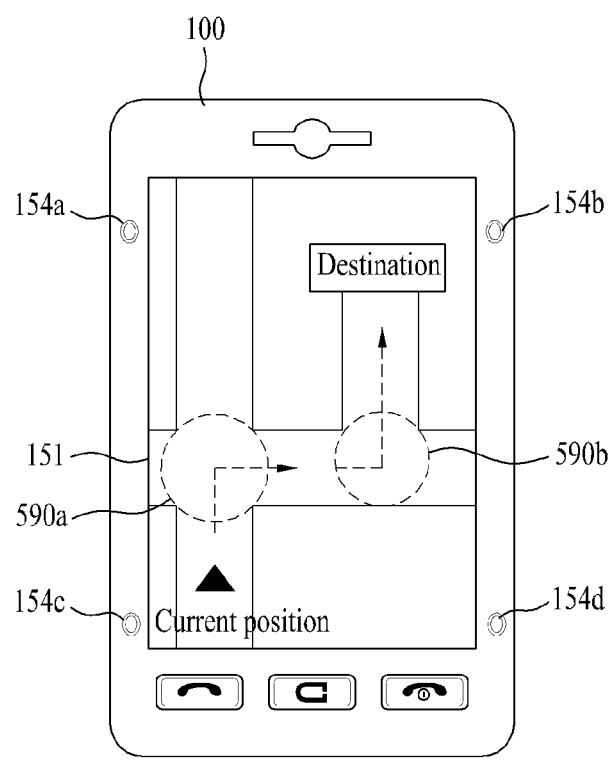

FIGS. 24A-24B depict a process for generating a haptic effect indicating an AR event related to input of a command for requesting a moving path guide to a specific object and/or object information item. More particularly, FIGS. 24A-24B are diagrams of a screen configuration of a process for generating a haptic effect indicating an event associated with the AR.

Referring to FIG. 24A, while a preview image 300A for the AR is displayed, a search window 580 for searching for a moving path to an object and/or object information item desired by a user is displayed. A specific search word 580a is input into the search window 580.

If a thirteenth event occurs, in which a command for requesting a moving path to a specific object and/or object information item is input, as indicated by the specific search word 580a, the controller 180 (FIG. 1) searches for the moving path to the object and/or object information item from a current position of the mobile terminal 100 using map data stored in the memory 160 (FIG. 1) and controls the display unit 151 to display the corresponding moving path (FIG. 24B). The controller 180 controls the haptic module 154 (FIG. 1) to generate a haptic effect to inform the user of the moving path to a final destination, such as the object, from the current position of the mobile terminal 100.

Referring to FIG. 24B, the controller 180 (FIG. 1) may control the first to fourth haptic modules 154a, 154b, 154c and 154d to generate a haptic effect indicating the direction of a first intermediate point 590a in relation to the current position of the mobile terminal 100. When the mobile terminal 100 arrives at the first intermediate point 590a, the controller 180 controls the first to fourth haptic modules 154a, 154b, 154c and 154d to generate a haptic effect indicating a direction to a second intermediate point 590b from the first intermediate point 590a. When the mobile terminal 100 arrives at the second intermediate point 590b, the controller 180 controls the first to fourth haptic modules 154a, 154b, 154c and 154d to generate a haptic effect indicating a direction to a final destination from the second intermediate point 590b.

If the mobile terminal 100 deviates from the moving path including the first and second intermediate points 590a and 590b, the controller 180 (FIG. 1) controls at least one of the haptic modules of the first to fourth haptic modules 154a, 154b, 154c and 154d to generate a haptic effect indicating that the mobile terminal 100 deviated from the moving path. Accordingly, a user can be notified of the deviation from the current path.

The present invention notifies a user of various events associated with the AR using various haptic effects. It will be apparent to those skilled in the art that the present invention can be specified into other form without departing from the spirit or scope of the inventions.

In addition, the above-described methods can be implemented in a program recorded medium as computer-readable codes. The computer-readable media includes all types of recording devices in which data readable by a computer system are stored. The computer-readable media includes ROM, RAM, CD-ROM, magnetic tapes, floppy discs, and optical data, as an example, and also includes carrier-wave type implementations, such as transmission via the Internet. The computer can include the control unit 180 (FIG. 1) of the terminal.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A mobile terminal, comprising:
   a camera configured to receive in real-time a preview image for an augmented reality (AR) function of the mobile terminal;
   at least one haptic module configured to generate a plurality of haptic effects;
   a display unit; and
   a controller configured to:
      obtain a current position of the mobile terminal;
      control the display unit to display in real-time the preview image,
   wherein the preview image includes a plurality of objects;
      control the display unit to display a plurality of object information items in conjunction with the preview image, wherein each item of the plurality of object information items is descriptive of a characteristic of an associated object of the plurality of objects;
      selecting a first object of the plurality of objects in response to a user input received at the mobile terminal;
      control the at least one haptic module to generate at least one haptic effect that is indicative of distance between the current position of the mobile terminal and a real position of the selected first object;

control the display unit to display a search window in conjunction with displaying of at least a portion of the preview image, the search window for receiving user input of a search term;

cause the at least one haptic module to generate a second haptic effect when the search term corresponds to a second object of the plurality of objects included in the preview image or when the search term corresponds to a first item of the plurality of object information items; and control the display unit to display the second object, or the first item, as shaking when the second haptic effect is generated.

2. The mobile terminal of claim 1, wherein the controller is further configured to:
control the at least one haptic module to generate at least one haptic effect indicating an existence of a hidden object or a hidden object information item that is virtually located behind the selected first object.

3. The mobile terminal of claim 1, wherein the controller is further configured to:
control the display unit to shift a position of the selected first object in response to an input;
control the at least one haptic module to generate at least one haptic effect indicating an existence of a hidden object or a hidden object information item that is virtually located behind the positioned-shifted selected first object.

4. The mobile terminal of claim 1, wherein the controller is further configured to control the at least one haptic module to change the at least one haptic effect related to the distance based on a change in the distance.

5. The mobile terminal of claim 1, wherein the controller is further configured to control the at least one haptic module to change a magnitude of the at least one haptic effect when the distance decreases.

6. The mobile terminal of claim 1, wherein the controller is further configured to:
control the display unit to display at least one new object or at least one new object information item in the preview image; and
control the at least one haptic module to generate at least one haptic effect indicating the displaying of the at least one new object or the at least one new object information item.

7. The mobile terminal of claim 6, wherein:
the controller is further configured to:
control the display unit to display a plurality of new objects or a plurality of new object information items; and
control the at least one haptic module to generate at least one haptic effect indicating distance between each of the plurality of new objects or between each of the plurality of new object information items.

8. The mobile terminal of claim 1, wherein the controller is further configured to:
control the display unit to change the preview image based on a change of a photographing view point of the camera; and
control the at least one haptic module to generate at least one haptic effect indicating the change of the preview image based on the change of the view point.

9. The mobile terminal of claim 1, further comprising an audio output module configured to output sound signals, wherein the controller is further configured to:
control the audio output module to output sound signals associated with the AR function; and control the at least one haptic module to generate at least one haptic effect indicating the output of the sound signals.

10. The mobile terminal of claim 1, wherein:
the at least one haptic effect is a vibration; and
the controller is further configured to control the display unit to display a representation of the selected first object as shaking when the at least one haptic effect is generated.

11. The mobile terminal of claim 1, wherein the controller is further configured to control the at least one haptic module to generate at least one haptic effect indicating a direction in which a third object is virtually situated in relation to the mobile terminal when the third object does not exist in the preview image.

12. The mobile terminal of claim 11, wherein:
the at least one haptic module comprises a first haptic module and a second haptic module; and
the controller is further configured to control the first haptic module to generate a first haptic effect and to control the second haptic module to generate a third haptic effect to indicate the direction in which the third object is virtually situated in relation to the mobile terminal by adjusting a magnitude of the first haptic effect and the third haptic effect.

13. The mobile terminal of claim 11, wherein the controller is further configured to control the display unit to display information indicating the direction in which the third object is virtually situated in relation to the mobile terminal.

14. The mobile terminal of claim 1, wherein the controller is further configured to:
control the display unit to display a path between the current position of the mobile terminal to the real position of the first object; and
control the haptic module to generate at least one haptic effect indicating the displaying of the path.

15. The mobile terminal of claim 14, wherein the controller is further configured to:
control the haptic module to generate at least one haptic effect indicating deviation of the mobile terminal from the path.

16. The mobile terminal of claim 1, wherein the controller is further configured to:
determine a number of a plurality of new objects or a number of a plurality of new object information items in the preview image when the plurality of new objects or the plurality of new object information items are displayed in the preview image; and
control the at least one haptic module to generate a number of different haptic effects in order equal to the number of the plurality of new objects or the number of the plurality of new object information items, the different haptic effects having different haptic patterns corresponding to each of the plurality of new objects or each of the plurality of new object information items.

17. A method for controlling a mobile terminal, the method comprising:
receiving in real-time, via a camera, a preview image for an augmented reality (AR) function;
obtaining a current position of the mobile terminal;
displaying in real-time the preview image, wherein the preview image includes a plurality of objects;
displaying a plurality of object information items in conjunction with the preview image, wherein each item of the plurality of object information items is descriptive of a characteristic of an associated object of the plurality of objects;

selecting a first object of the plurality of objects in response to a user input received at the mobile terminal;

generating at least one haptic effect that is indicative of distance between the current position of the mobile terminal and a real position of the selected first object;

displaying a search window in conjunction with displaying of at least a portion of the preview image, the search window for receiving user input of a search term; and generating a second haptic effect when the search term corresponds to a second object of the plurality of objects included in the preview image or when the search term corresponds to a first item of the plurality of object information items; and displaying the second object, or the first item, as shaking when the second haptic effect is generated.

18. The method of claim 17, further comprising:
generating at least one haptic effect indicating an existence of a hidden object or a hidden object information item that is virtually located behind the selected first object.

19. The method of claim 17, further comprising:
shifting a position of the selected first object in response to an input;
generating at least one haptic effect indicating an existence of a hidden object or a hidden object information item that is virtually located behind the positioned-shifted selected first object.

20. The method of claim 17, further comprising:
changing the at least one haptic effect related to the distance based on a change in the distance.

21. The method of claim 17, further comprising:
changing a magnitude of the at least one haptic effect when the distance decreases.

22. The method of claim 17, further comprising:
displaying at least one new object or at least one new object information item in the preview image; and
generating at least one haptic effect indicating the displaying of the at least one new object or the at least one new object information item.

23. The method of claim 22, further comprising:
displaying a plurality of new objects or a plurality of new object information items; and
generating at least one haptic effect indicating distance between each of the plurality of new objects or between each of the plurality of new object information items.

24. The method of claim 17 further comprising:
changing the preview image based on a change of a photographing view point of the camera; and
generating at least one haptic effect indicating the change of the preview image based on the change of the photographing view point.

25. The method of claim 17, further comprising:
outputting sound signals associated with the AR function; and
generating at least one haptic effect indicating the outputting of the sound signals.

26. The method of claim 17, wherein the at least one haptic effect is a vibration, the method further comprising:
displaying a representation of the selected first object as shaking when the at least one haptic effect is generated.

27. The method of claim 17, further comprising:
generating at least one haptic effect indicating a direction in which a third object is virtually situated in relation to the mobile terminal when the third object does not exist in the preview image.

28. The method of claim 27, further comprising:
controlling a first haptic module to generate a first haptic effect; and
controlling a second haptic module to generate a second haptic effect to indicate the direction in which the third object is virtually situated in relation to the mobile terminal by adjusting a magnitude of the first haptic effect and the second haptic effect generated by the second haptic module.

29. The method of claim 27, further comprising:
displaying information indicating the direction in which the third object is virtually situated in relation to the mobile terminal.

30. The method of claim 17, further comprising:
displaying a path between the current position of the mobile terminal to the real position of the first object; and
generating at least one haptic effect indicating the displaying of the path.

31. The method of claim 30, further comprising:
generating at least one haptic effect indicating deviation of the mobile terminal from the path.

32. The method of claim 27, further comprising:
determining a number of a plurality of new objects or a number of a plurality of new object information items in the preview image when the plurality of new objects or the plurality of new object information items are displayed in the preview image; and
generating a number of different haptic effects in order equal to the number of the plurality of new objects or the number of the plurality of new object information items, the different haptic effects having different haptic patterns corresponding to each of the plurality of new objects or each of the plurality of new object information items.

* * * * *